(12) United States Patent
Motonaga et al.

(10) Patent No.: US 8,616,599 B2
(45) Date of Patent: Dec. 31, 2013

(54) HAND AND ROBOT

(75) Inventors: Kenichi Motonaga, Kitakyushu (JP);
Takashi Baba, Kitakyushu (JP);
Toshiyuki Harada, Kitakyushu (JP);
Yoichiro Dan, Kitakyushu (JP);
Yoshiaki Kubota, Kitakyushu (JP); Jun Tijiwa, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 91 days.

(21) Appl. No.: 13/228,434

(22) Filed: Sep. 8, 2011

(65) Prior Publication Data

US 2012/0061981 A1    Mar. 15, 2012

(30) Foreign Application Priority Data

Sep. 10, 2010  (JP) .................................. 2010-203413
Oct. 13, 2010  (JP) .................................. 2010-230763

(51) Int. Cl.
*B25J 15/02*  (2006.01)

(52) U.S. Cl.
USPC .......... 294/119.1; 294/86.4; 414/783; 901/32

(58) Field of Classification Search
USPC ............ 294/119.1, 86.4, 207; 901/32, 38, 39; 414/783
See application file for complete search history.

(56) References Cited

U.S. PATENT DOCUMENTS 2,390,293 A * 12/1945 Colson ........................ 294/86.41
4,042,122 A *  8/1977 Espy et al. .................... 414/728
5,924,545 A *  7/1999 Crorey ......................... 198/375
6,994,510 B2 *  2/2006 Cooke .......................... 414/626
7,695,239 B2 *  4/2010 Wu .............................. 414/783

FOREIGN PATENT DOCUMENTS

| DE | 9213010 U1    | 11/1992 |
| DE | 102005026150 B3 | 1/2007 |
| EP | 0999170       | 5/2000  |
| JP | 51-121978     | 3/1975  |
| JP | 50-40865      | 11/1975 |
| JP | 58-137591     | 8/1983  |
| JP | 63-106248     | 5/1988  |
| JP | 01-274987     | 11/1989 |
| JP | 06-21877 U    | 3/1994  |
| JP | 07-214013     | 8/1995  |
| JP | 09-038884     | 2/1997  |
| JP | 09-309088     | 12/1997 |

(Continued)

OTHER PUBLICATIONS

Extended European Search Report for corresponding EP Application No. 11180402.7-2316, Nov. 16, 2011.

(Continued)

*Primary Examiner* — Dean Kramer
(74) *Attorney, Agent, or Firm* — Ditthavong Mori & Steiner, P.C.

(57) ABSTRACT

A hand according to an embodiment includes a pair of supporting units, a pair of capturing claws, an opening-and-closing mechanism, and a reciprocating mechanism. The pair of capturing claws are supported on the inner surfaces of the pair of respective supporting units and capture a part. The opening-and-closing mechanism opens and closes the pair of supporting units along a reciprocating axis intersecting with longitudinal directions of the supporting units. The reciprocating mechanism causes the pair of capturing claws to rotate about the reciprocating axis to change the direction of each tip of the capturing claws.

18 Claims, 32 Drawing Sheets

(56) References Cited

FOREIGN PATENT DOCUMENTS

| | | |
|---|---|---|
| JP | 10-329121 | 12/1998 |
| JP | 2002-283268 | 10/2002 |
| JP | 2006-191939 | 7/2006 |
| JP | 2007-015029 | 1/2007 |
| JP | 2009-148846 | 7/2009 |

OTHER PUBLICATIONS

Japanese Office Action for corresponding JP Application No. 2010-203413, Aug. 13, 2013.
Japanese Office Action for corresponding JP Application No. 2010-230763, Sep. 30, 2013.

* cited by examiner

HAND AND ROBOT

CROSS-REFERENCE TO RELATED APPLICATIONS

This application is based upon and claims the benefit of priority of the prior Japanese Patent Application No. 2010-203413, filed on Sep. 10, 2010; and Japanese Patent Application No. 2010-230763, filed on Oct. 13, 2010, the entire contents of both of which are incorporated herein by reference.

FIELD

The embodiments discussed herein are directed to a hand and a robot.

BACKGROUND

Japanese Patent Application Laid-open No. 2002-283268 discloses a sliding chuck that is driven by a motor and captures various objects to be captured in different shapes reliably and quickly.

SUMMARY

A hand according to one aspect of an embodiment includes a pair of supporting units, a pair of capturing claws, an opening-and-closing mechanism, and a reciprocating mechanism. The pair of capturing claws are supported on inner surfaces of the pair of respective supporting units and capture a part. The opening-and-closing mechanism opens and closes the pair of supporting units along a reciprocating axis intersecting with longitudinal directions of the supporting units. The reciprocating mechanism causes the pair of capturing claws to rotate about the reciprocating axis to change a direction of each tip of the capturing claws.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

A hand according to an embodiment includes a pair of supporting units, a pair of capturing claws that are supported on the inner surfaces of the pair of respective supporting units and capture a part, an opening-and-closing mechanism that opens and closes the pair of supporting units along a reciprocating axis intersecting with longitudinal directions of the supporting units, a reciprocating mechanism that causes the pair of capturing claws to reciprocate about the reciprocating axis to change the direction of the tip of the capturing claws.

Furthermore, the hand according to an embodiment also includes a pair of supporting units, a pair of capturing units that are supported by the pair of respective supporting units and capture a part, an opening-and-closing unit that opens and closes the pair of supporting units along an axis intersecting with longitudinal directions of the supporting units, and a changing unit that changes the direction of each tip of the pair of capturing units about the axis.

A robot according to an embodiment includes a hand that captures a part, and the hand further includes a pair of supporting units, a pair of capturing claws that are supported on the inner surfaces of the pair of respective supporting units and capture a part, an opening-and-closing mechanism that opens and closes the pair of supporting units along a reciprocating axis intersecting with longitudinal directions of the supporting units, and a reciprocating mechanism that reciprocates the capturing claws about the reciprocating axis to change the direction of the tip of the capturing claws.

To begin with, a first embodiment will be explained.

Figure 1:
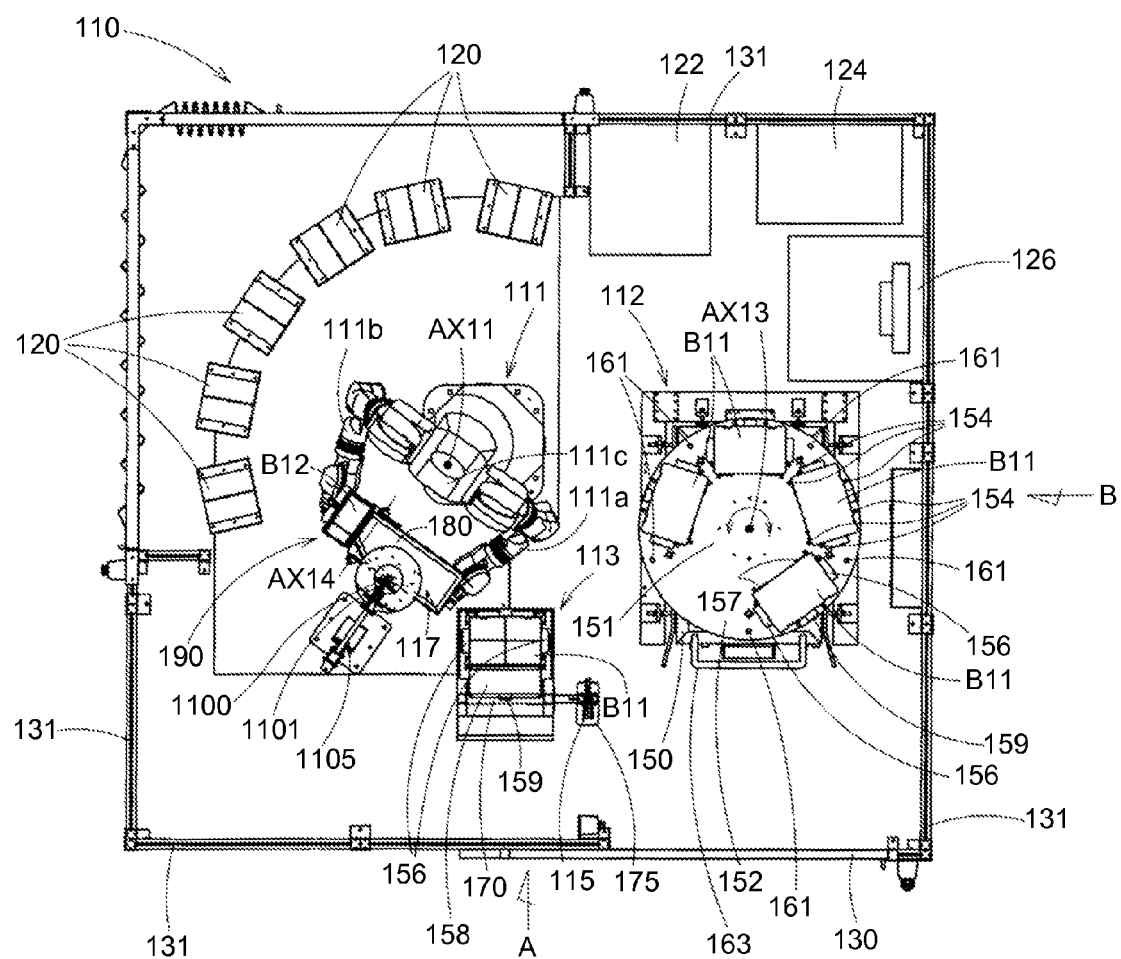
FIG. 1 is a plan view of a part picking system including a dual-arm manipulator according to a first embodiment.

As illustrated in FIG. 1, a part picking system 110 includes a dual-arm manipulator (an example of a robot) 111 according to the first embodiment, a serving table 113, a scraper 115, a working table 117, a two-dimensional camera 1100, and a plurality of part racks 120. The part picking system 110 further includes a robot controller 122, a system controller 124, and an image processing computer 126.

Among these elements, the serving table 113, the working table 117, and the part racks 120 are arranged around the dual-arm manipulator 111 sequentially in the clockwise direction. It is especially preferable for each of the part racks 120 to be arranged along substantially the same circumference about a rotation axis (an axis intersecting with a surface where the dual-arm manipulator 111 is installed) AX11 of a torso 111c of the dual-arm manipulator 111. By arranging these elements such as the serving table 113 in this manner, the flow line of the dual-arm manipulator 111 is shortened and the dual-arm manipulator 111 is enabled to operate efficiently.

Figure 2:
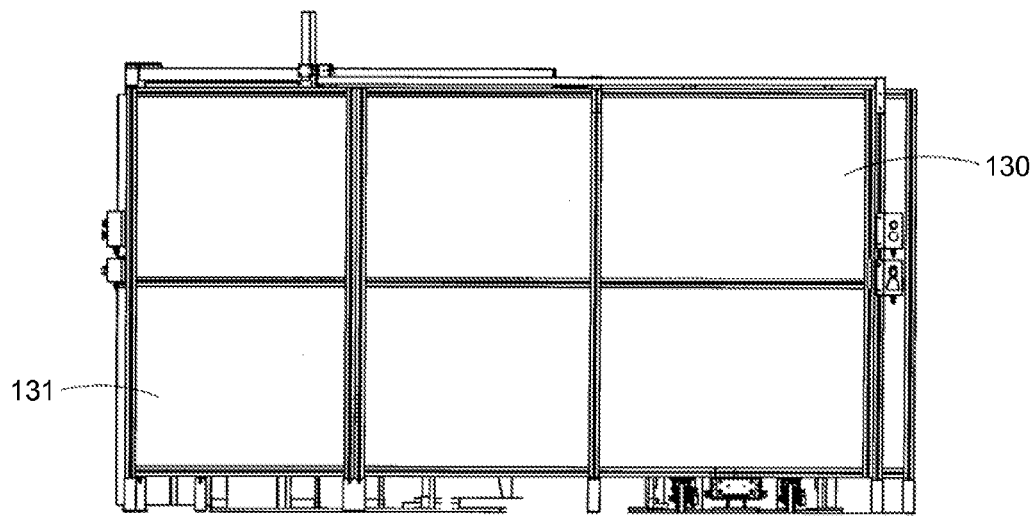
FIG. 2 is a front view of the part picking system including the dual-arm manipulator (a view seen in the direction of the arrow A in FIG. 1).
Figure 3:
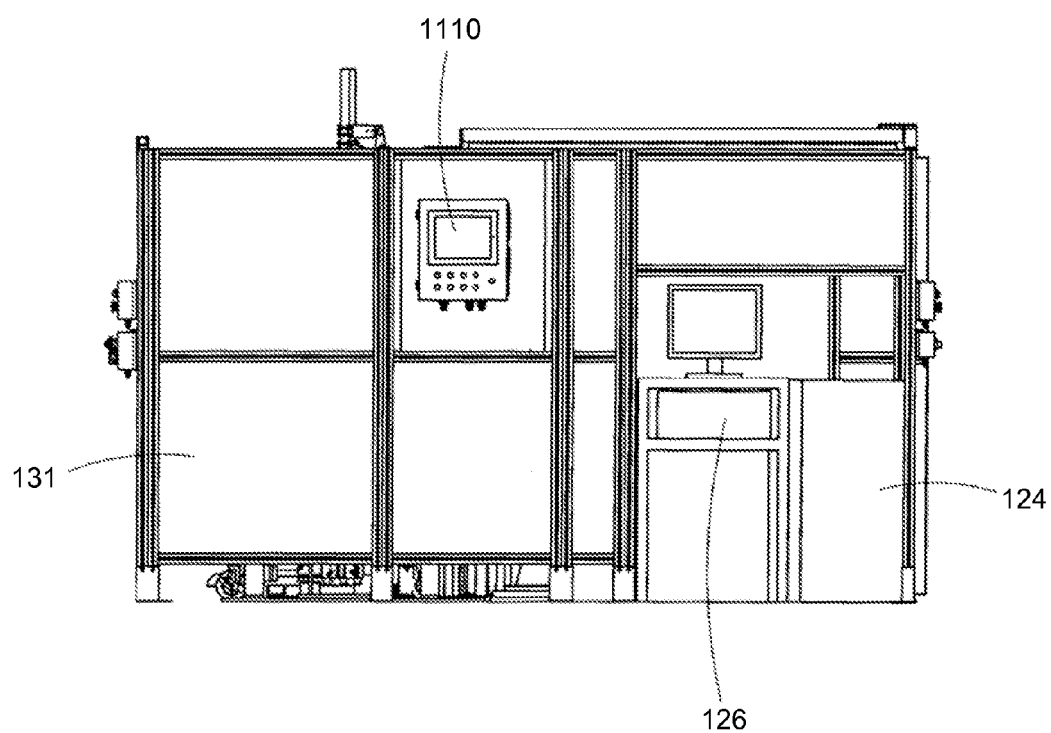
FIG. 3 is a side view of the part picking system including the dual-arm manipulator (a view seen in the direction of the arrow B in FIG. 1).

Using the dual-arm manipulator 111, the part picking system 110 can take out bolts of a required type (an example of a part) in the required quantity from the part rack 120, and store the bolts in serving boxes B11 stacked in plurality on a delivery carriage 112. The part picking system 110 is surrounded by a protection wall 131 having a gate with a sliding door 130, as illustrated in FIGS. 1 to 3.

The dual-arm manipulator 111 has a left arm 111a and a right arm 111b, arranged on the left side and the right side of the rotatable torso 111c, respectively. Each of the left arm 111a and the right arm 111b is a multi-joint manipulator having seven joint axes, for example.

Figure 4A:
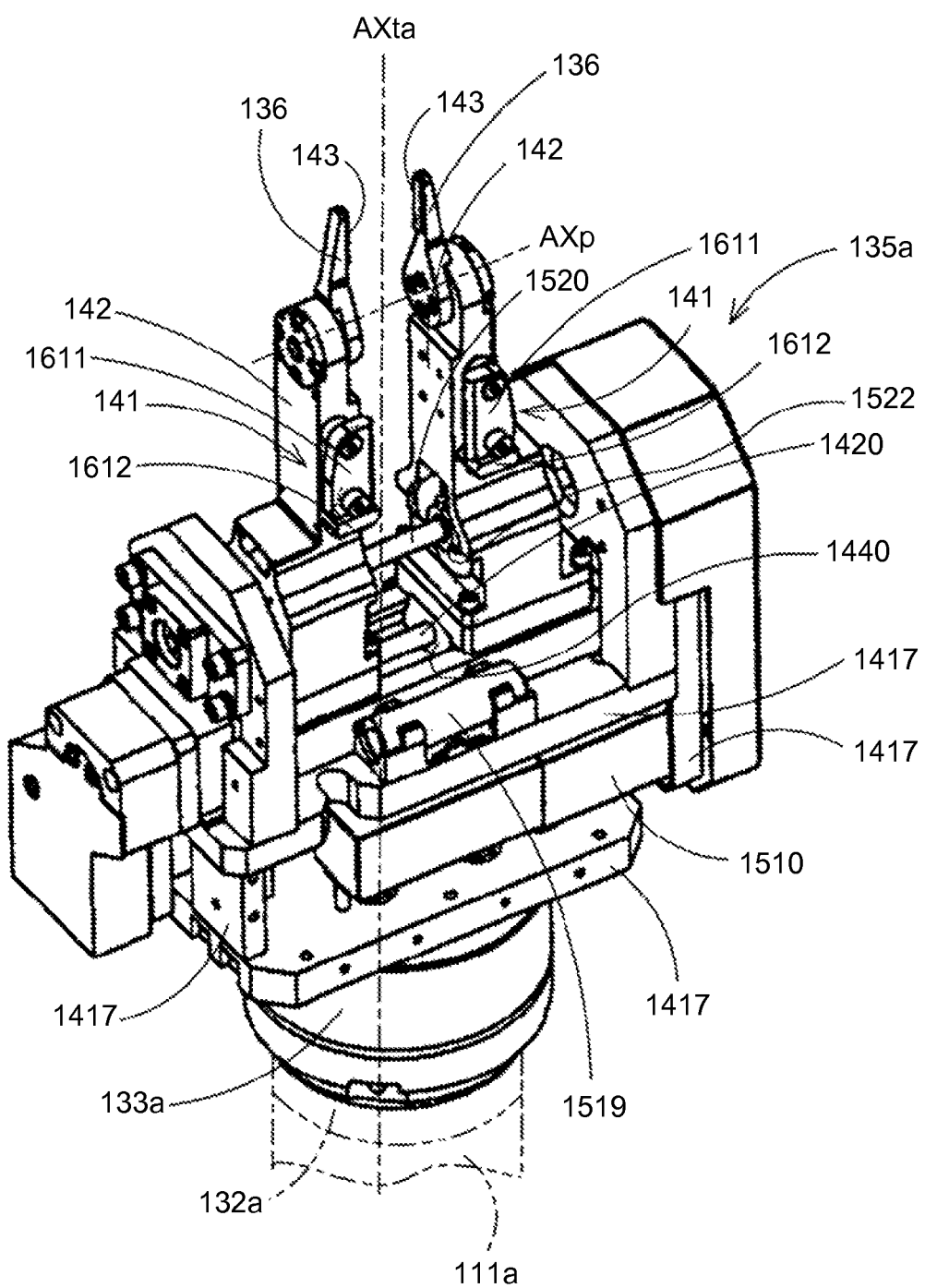
FIG. 4A is a perspective view of a left hand included in the dual-arm manipulator.
Figure 4B:
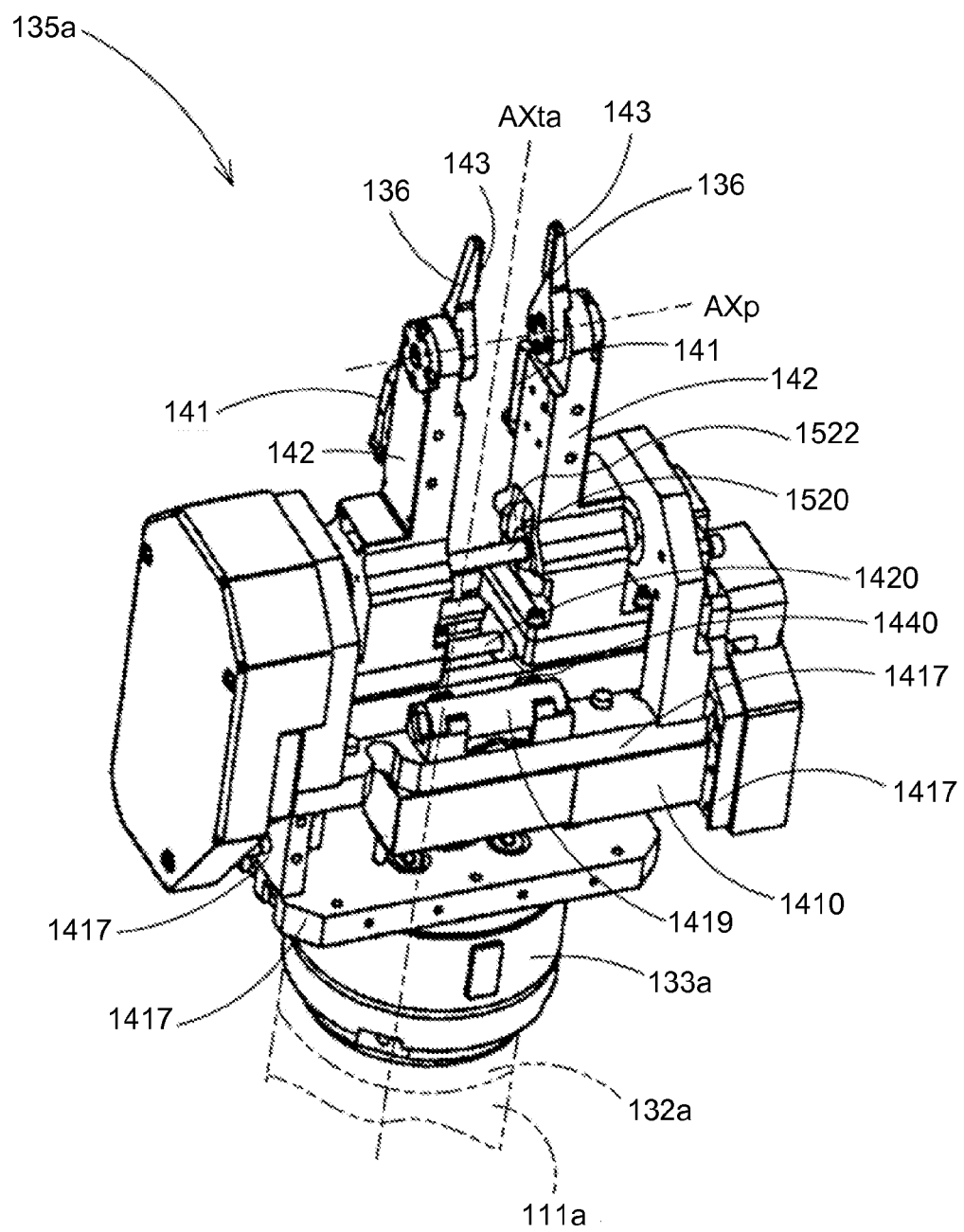
FIG. 4B is a perspective view of the left hand included in the dual-arm manipulator seen from a different angle from that in FIG. 4A.

A left hand (an example of a hand) 135a is attached to a wrist flange 132a on the fore end of the left arm 111a via a left force sensor 133a, as illustrated in FIGS. 4A and 4B. The left hand 135a includes a pair of the capturing claws 136, and a pair of tool holders 141 for holding the scraper (an example of a tool) 115 to be described later.

The capturing claws 136 are supported on the inner fore ends of a pair of supporting units 142 extending along the direction of a rotation axis AXt, for example. The capturing claws 136 can change the direction of the tips thereof by being reciprocated about a reciprocating axis AXp that intersects with the longitudinal direction of the supporting units 142.

The capturing claws 136 are configured to be openable and closable along the reciprocating axis AXp as the supporting units 142 are opened and closed. The thickness of each of the capturing claws 136 is gradually reduced toward the tip, when the left hand 135a is viewed from the front side (see FIG. 4C). A slipping prevention pad 143 is placed at the tip of the capturing claw 136, on the inner surface of the capturing claw 136.

The tool holders 141 are arranged on the pair of supporting units 142 so that the tool holders 141 are opened and closed when the capturing claws 136 are opened and closed.

Figure 5:
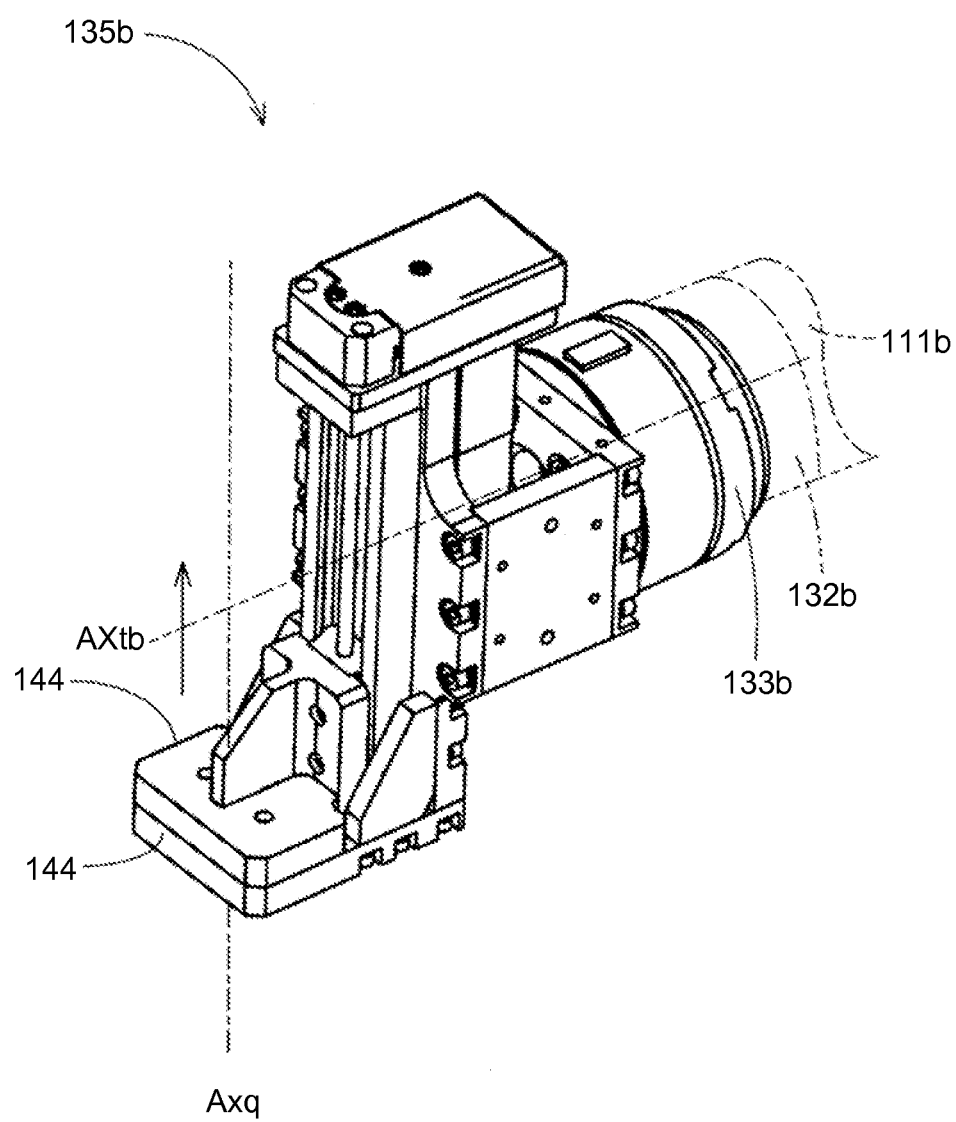
FIG. 5 is a perspective view of a right hand included in the dual-arm manipulator.

A right hand 135b is attached to a wrist flange 132b on the fore end of the right arm 111b via a right force sensor 133b, as illustrated in FIG. 5. The right hand 135b can hold a part box B12 containing bolts.

The right hand 135b includes a pair of capturing claws 144 for nipping and holding the rear surface of the part box B12 from the vertical directions. The capturing claws 144 are configured to be openable and closable in the direction of an opening-and-closing axis AXq intersecting with a rotation axis AXtb of the wrist flange 132b. In FIG. 5, the capturing claws 144 are depicted as closed.

The left force sensor 133a and the right force sensor 133b are connected to the system controller 124 via the robot controller 122.

The delivery carriage 112 will now be explained. The delivery carriage 112 can be used to carry the serving box B11 for storing therein a bolt captured by the dual-arm manipulator 111. The delivery carriage 112 includes a carriage frame 150, and a rotating table 151 that is supported on the carriage frame 150 and is rotated about a vertical axis AX3.

Wheels (not illustrated) are attached to the bottom of the carriage frame 150. A determining unit (not illustrated) for determining a rotation angle of the rotating table 151, and a fixing unit (not illustrated) for fixing the position of the angular position of the rotating table 151 are also mounted on the carriage frame 150.

The rotating table 151 includes a disk-shaped top panel 152. The top panel 152 can hold a plurality of serving boxes B11 along the outer circumference of the top panel 152, e.g., at five locations thereof. The serving boxes B11 are aligned horizontally by a plurality of guiding poles 154 extending from the top panel 152 in an upward direction, and are stacked in ten layers, for example.

The serving box B11 is a container partitioned into a plurality of compartments (e.g., four compartments as illustrated in the serving box B11 placed on the serving table 113), and having handles 156 arranged on the right side and the left side. A lid 158 supported rotatably by a hinge 157 on the rear side of the serving box B11 and opening upwardly is arranged on the top surface of the serving box B11. A handle 159 protruding toward the front is arranged on the lid 158. The serving box B11 is, for example, a part box made of resin. A predetermined type of bolts is stored in each of the compartments of the serving box B11.

Pasted on the rear surface of the serving box B11 is a two-dimensional barcode, not illustrated, storing therein first mapping information that establishes a mapping relationship between each of the compartments of the serving box B11 and a type (e.g., a diameter, a length, and a material of the bolts) and a quantity of the bolts to be stored in the compartment. The two-dimensional barcode may be replaced with a one-dimensional barcode. Because the two-dimensional barcode storing therein the first mapping information is directly pasted on the serving box B11, the mapping relationship between the serving box B11 and the bolts to be stored in the serving box B11 is made clear.

A plurality of handle bars 161 extending upwardly is arranged on the top panel 152. The dual-arm manipulator 111 can use the supporting units 142 on the left hand 135$a$ to hold the handle bars 161 and to rotate the rotating table 151 about a vertical axis AX13.

Furthermore, the delivery carriage 112 is provided with a bar 163. An operator can hold the bar 163 upon moving the delivery carriage 112. The operator carries in and out the delivery carriage 112 on which the serving boxes B11 are placed through the gate having the sliding door 130. When the delivery carriage 112 is delivered to a predetermined position, the delivery carriage 112 is lifted from the bottom by an air cylinder not illustrated. As a result, the delivery carriage 112 is fixed while the wheels are lifted above the floor.

The serving table 113 is a table on which the serving box B11 taken out from the delivery carriage 112 by the dual-arm manipulator 111 is placed. The dual-arm manipulator 111 takes out and moves bolts from the part box B12 stored in the part rack 120 to the serving box B11 placed on the serving table 113.

The serving table 113 is provided with a load sensor (not illustrated) for detecting whether the serving box B11 is placed on the serving table 113, an opening/closing detection sensor (not illustrated) for detecting whether the lid 158 of the serving box B11 on the serving table 113 is open or closed, and a barcode reader (not illustrated) for reading the two-dimensional barcode pasted on the serving box B11. The load sensor, the opening/closing detection sensor, and the barcode reader are connected to the system controller 124. The serving table 113 is further provided with a supporting member 170 for supporting the lid 158 of the serving box B11.

The scraper 115 is a tool for allowing the dual-arm manipulator 111 to scrape out the bolts stored in the part box B12 onto the working table 117. The scraper 115 has a haft 172, and a scraping claw 173 arranged at the tip of the haft 172. The scraping claw 173 is made from a plurality of metallic rods, each curving from its root toward its tip (see FIG. 7). The haft 172 has an adaptor (not illustrated) mounted thereon for being connected to the tool holders 141 on the left hand 135$a$. The scraper 115 is placed on a stand 175.

The working table 117 is placed within a movable range of the dual-arm manipulator 111, and is a table where the dual-arm manipulator 111 picks up the bolts scraped out of the part box B12. The working table 117 has a tilting top panel 180 on which the bolts thus scraped out are loaded, and a part box stand 190 on which the part box B12 is temporarily placed. The tilting top panel 180 is a rectangular plate member, for example. The tilting top panel 180 can be rotated about a rotation axis AX14 being approximately horizontal, intersecting with the longitudinal direction of the tilting top panel 180, and laid along an end of the tilting top panel 180. The part box stand 190 is arranged beside the tilting top panel 180 where the rotation axis AX14 is laid.

Therefore, when the dual-arm manipulator 111 picks up the other end of the tilting top panel 180, the tilting top panel 180 is tilted about the rotation axis AX14, and the bolts placed on the tilting top panel 180 are returned to the part box B12, which is temporarily placed on the part box stand 190. The part box stand 190 has a load sensor (not illustrated) for detecting whether the part box B12 is placed thereon.

The two-dimensional camera 1100 is placed above the tilting top panel 180 so that the two-dimensional camera 1100 can capture a two-dimensional image of the bolts placed on the working table 117. The two-dimensional camera 1100 is a two-dimensional monochromatic camera with four million pixels, for example. The two-dimensional camera 1100 is supported on a stand 1105 so that the vertical position thereof can be adjusted. An illumination device 1101 for ensuring an imaging illuminance for the two-dimensional camera 1100 is arranged on the stand 1105.

The two-dimensional camera 1100 is connected to the image processing computer 126. The image captured by the two-dimensional camera 1100 is transmitted to the image processing computer 126. The two-dimensional camera 1100 is also connected to the system controller 124, and operations such as image capturing are controlled by the system controller 124.

The part rack 120 is a rack for storing therein a plurality of part boxes B12. The part rack 120 is partitioned into a plurality of compartments along the vertical and horizontal directions, and has openings on the front and the rear sides. Therefore, the dual-arm manipulator 111 can take out a part box B12 from the front side of the part rack 120. An operator can pull out a part box B12 from the rear side of the part rack 120.

Figure 6:
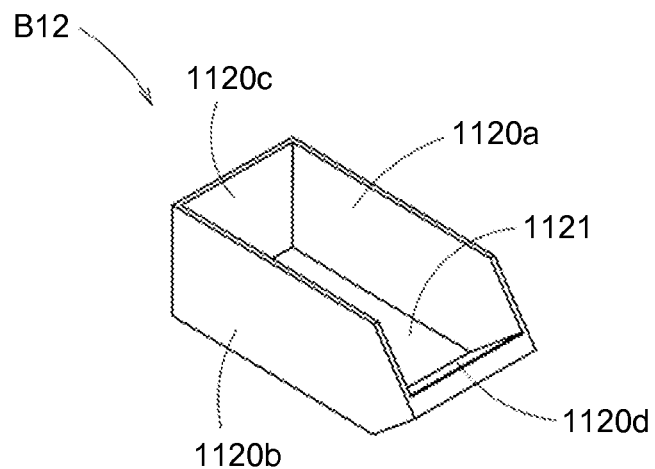
FIG. 6 is a perspective view of a part box held by the dual-arm manipulator.

The part box B12 is formed of a right side plate 1120$a$, a left side plate 1120$b$, and a rear side plate 1120$c$ extending upwardly from edges on the right side, the left side, and the rear side of a rectangular-shaped bottom plate 1121, respectively, as illustrated in FIG. 6. A front side plate 1120$d$ is titled to the front, and has a smaller length from the edge of the bottom plate 1121 to the end of the front side plate 1120$d$ than corresponding lengths in the right side plate 1120$a$, the left side plate 1120$b$, and the rear side plate 1120$c$. In other words, the part box B12 opens to the top and to an upper portion of the front side. Although details will be described later, the dual-arm manipulator 111 scrapes out the bolts from the front side of the part box B12.

Each of the part racks 120 is partitioned into compartments of two columns and five rows, for example, and each part box B12 storing therein different types of bolts is stored in each of the compartments. Therefore, when each of the part racks 120 is partitioned into compartments of two columns and five rows, 60 types of bolts can be stored in total in the part racks 120 across the entire part picking system 110 illustrated in FIG. 1.

The part box B12 is stored so that the rear side thereof faces the dual-arm manipulator 111 (so that the front side of the part box B12 faces outer side of the part picking system 110). Second mapping information indicating which part box B12 storing therein what type of bolts is kept in which compartment is stored in the system controller 124 in advance.

A process for storing the second mapping information in the system controller 124 will now be explained in detail. As a job performed before storing the second mapping information, operation instruction data for the dual-arm manipulator 111, including the position of each of the compartments, is stored in the robot controller 122.

By contrast, pasted on each of the part boxes B12, which are stored in the part racks 120, is a barcode (or may be a two-dimensional barcode) having information about the type of bolts that are stored therein. The dual-arm manipulator 111 causes the barcode reader arranged on the serving table 113 to read the barcode on each of the part boxes B12. The dual-arm manipulator 111 then stores the part boxes B12 in the respective compartments based on the operation instruction data. At this time, the information stored in the barcode that is pasted on each of the part boxes B12 (information storing therein at least the information about the type of bolts) is mapped to the position of each of the compartments, and the information is stored in the system controller 124 as the second mapping information.

A lamp (not illustrated) for indicating that the quantity of the bolts in the part box B12 has become smaller than a predetermined quantity is arranged by each of the compartments on the rear side of the part rack 120. When this lamp turns on, an operator can pull out the corresponding part box B12 from the rear side of the part rack 120, and fill the part box B12 with the bolts.

The robot controller 122 is connected to the dual-arm manipulator 111, and is capable of controlling operations of the dual-arm manipulator 111.

The system controller 124 is connected to the robot controller 122, and is capable of controlling the entire part picking system 110. In particular, the system controller 124 is capable of controlling the lamps to turn on. An operator can operate the system controller 124 with a touch panel 1110 (see FIG. 3). The system controller 124 includes, for example, a programmable logic controller.

The image processing computer 126 is connected to the two-dimensional camera 1100 and to the system controller 124, and is mainly capable of processing the images captured by the two-dimensional camera 1100.

The left hand 135*a* will now be explained in detail with reference to FIGS. 4A to 4I. As mentioned earlier, the capturing claws 136 on the left hand 135*a* open and close along the directions of the reciprocating axis AXp, and are capable of picking up a bolt. The capturing claws 136 reciprocate about the reciprocating axis AXp to change the direction of the tip of the capturing claws 136. The former operation, which is the opening and closing operations of the capturing claws 136 (the supporting units 142), is realized by an opening-and-closing mechanism 1400, and the latter operation of changing the direction of the capturing claws 136 is realized by a reciprocating mechanism 1500.

Figure 4C:
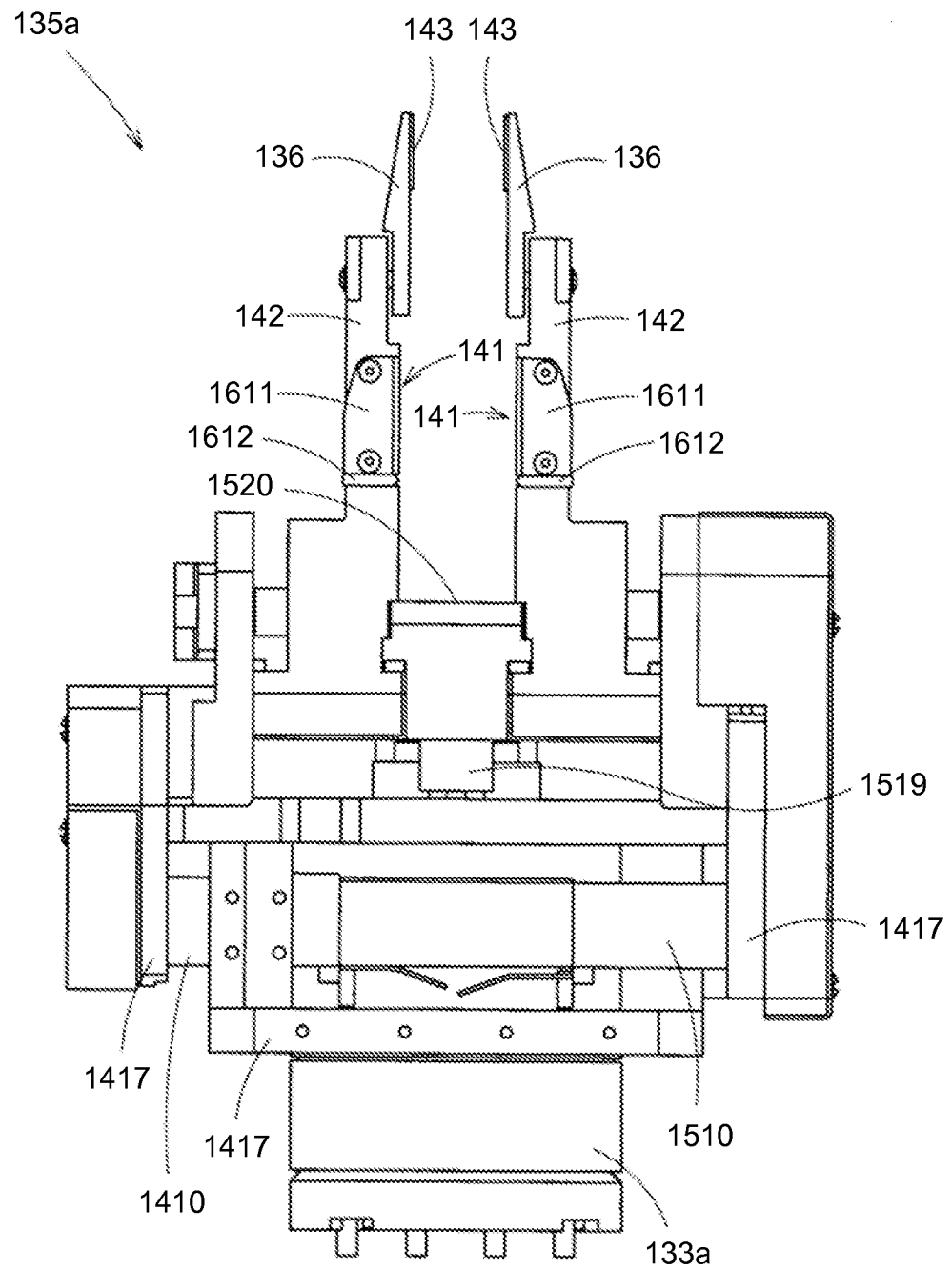
FIG. 4C is a front view of the left hand included in the dual-arm manipulator.
Figure 4D:
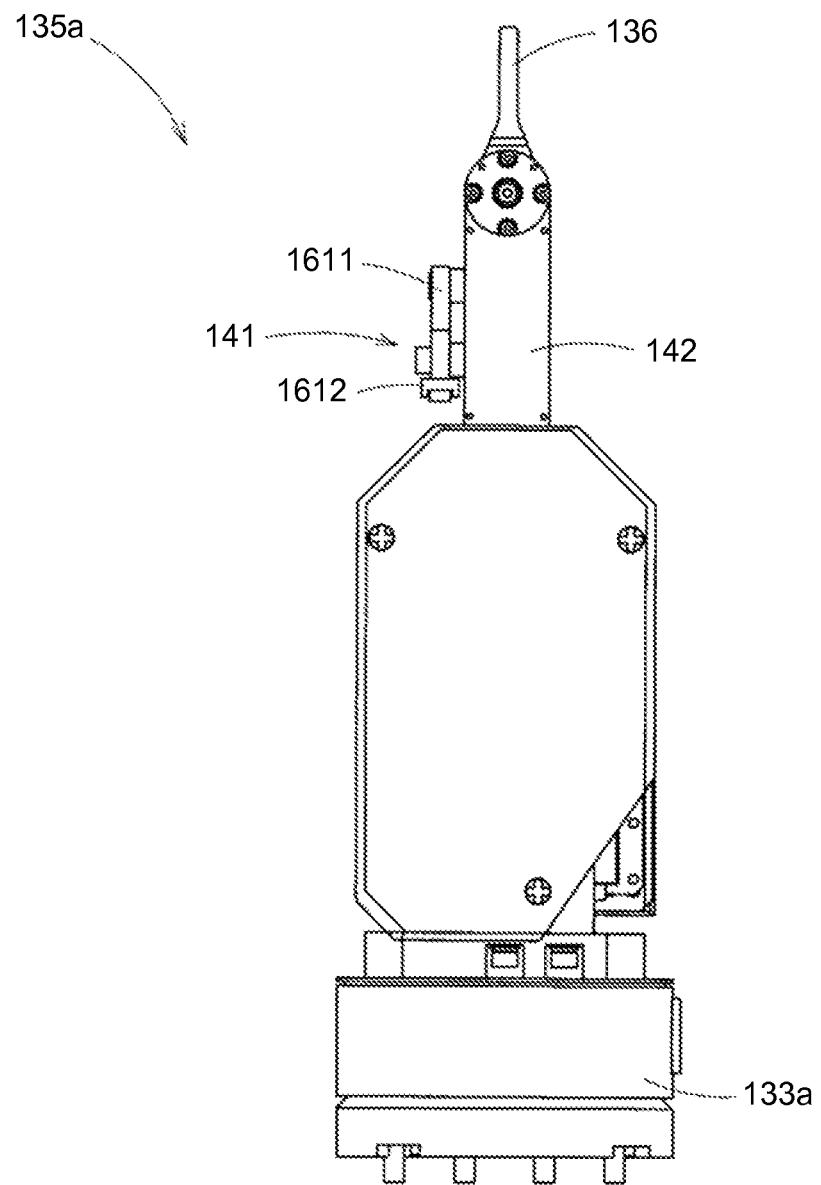
FIG. 4D is a side view of the left hand included in the dual-arm manipulator.
Figure 4E:
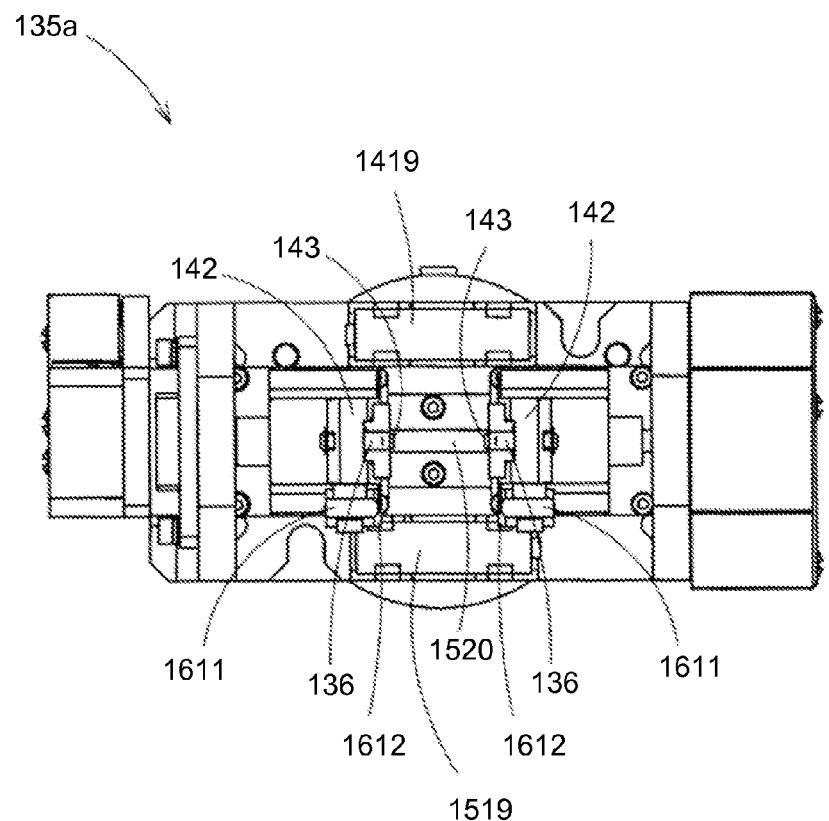
FIG. 4E is a bottom view of the left hand included in the dual-arm manipulator.
Figure 4F:
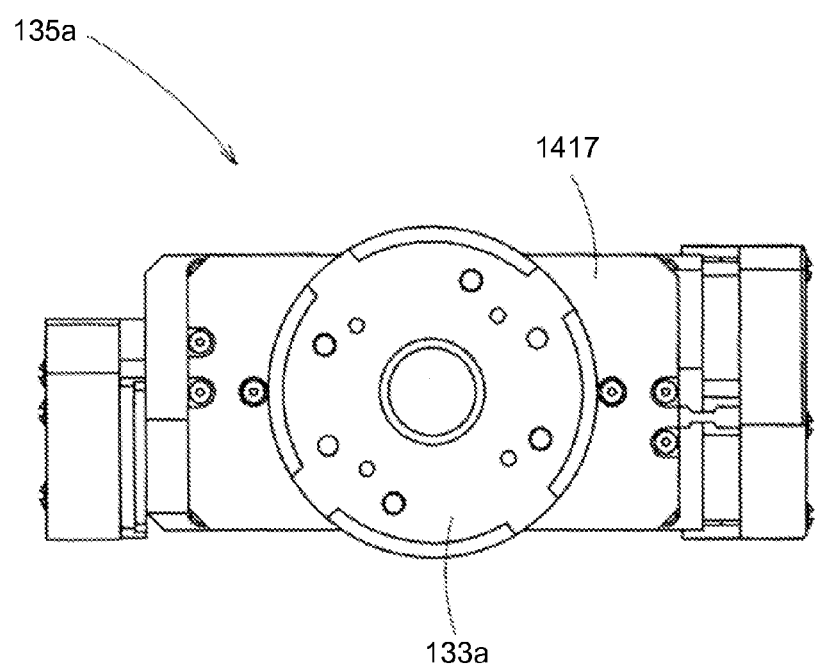
FIG. 4F is a plan view of the left hand included in the dual-arm manipulator.
Figure 4G:
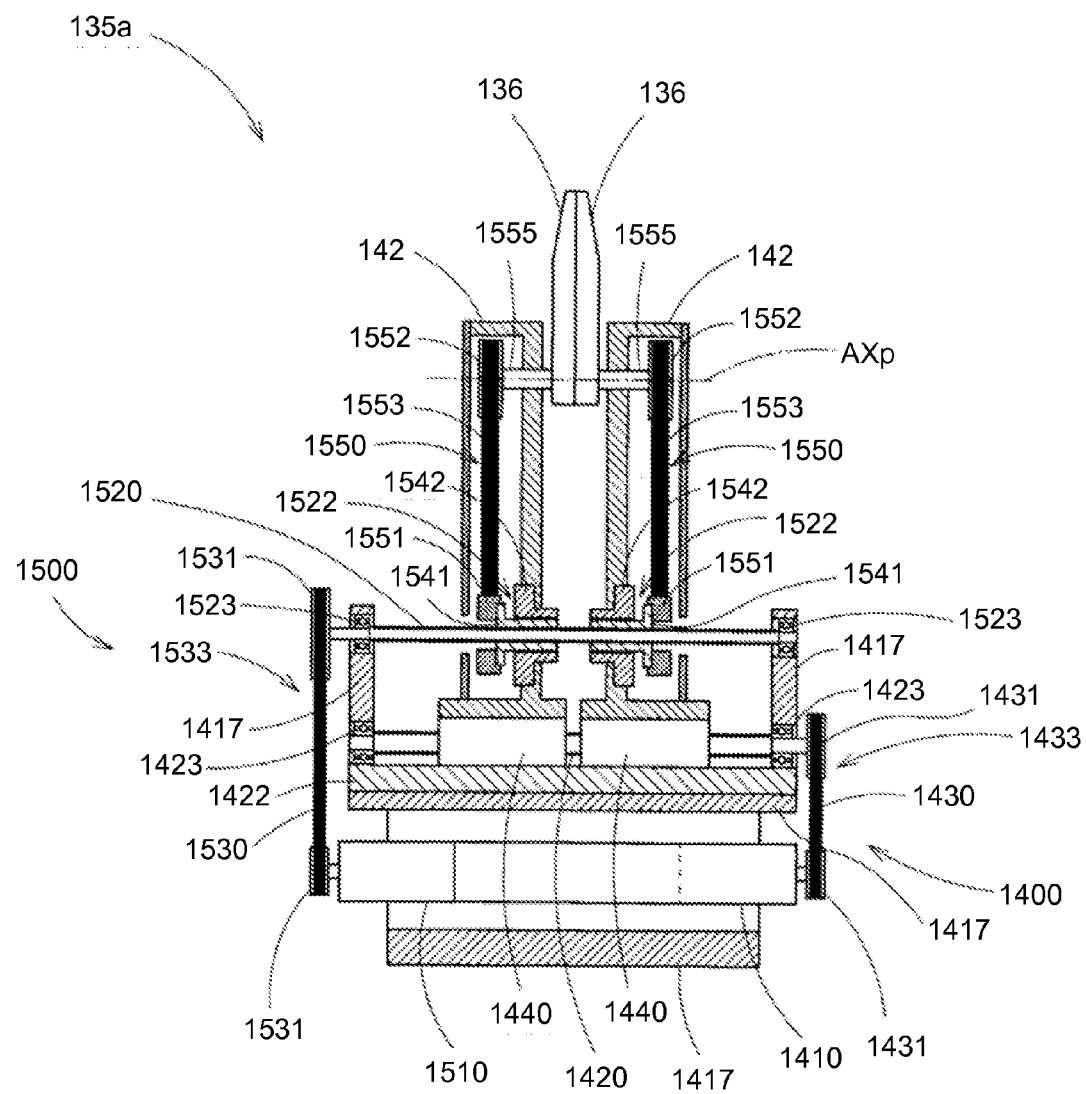
FIG. 4G is a schematic illustrating an internal structure of the left hand included in the dual-arm manipulator with capturing claws closed.
Figure 4H:
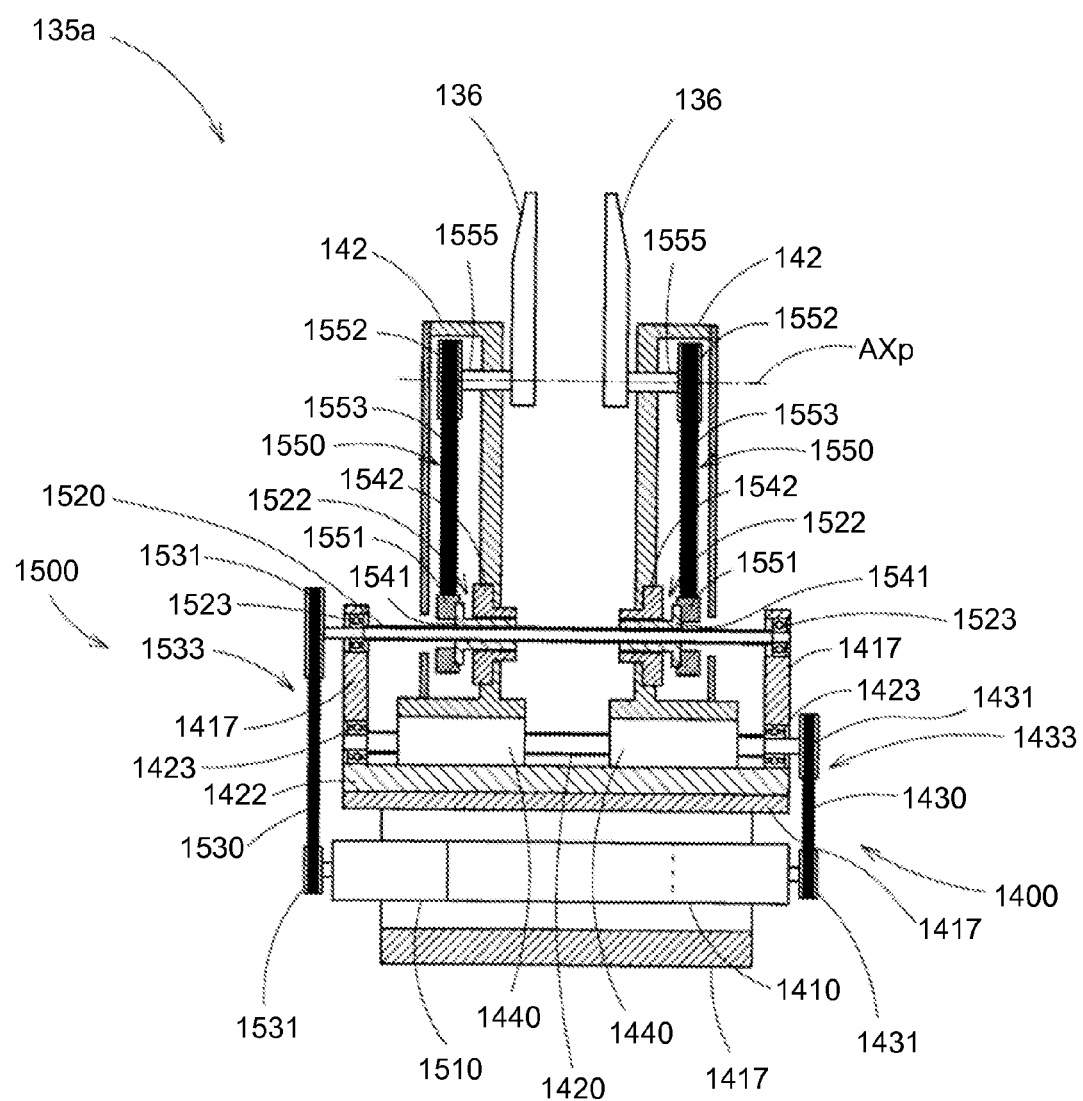
FIG. 4H is a schematic illustrating the internal structure of the left hand included in the dual-arm manipulator with the capturing claws opened.

As illustrated in FIG. 4G, the opening-and-closing mechanism 1400 includes an opening-and-closing servo motor 1410, a right-and-left screw shaft 1420 rotated by the opening-and-closing servo motor 1410, and a pair of moving units 1440 that are moved to the opposite directions by rotation of the right-and-left screw shaft 1420.

The opening-and-closing servo motor 1410 is mounted on a frame 1417 at the base of the left hand 135*a* so that the longitudinal direction of the opening-and-closing servo motor 1410 is laid in parallel with the reciprocating axis AXp. Being in "parallel" herein does not necessarily mean being in parallel in an exact sense. In other words, being in "parallel" means being "substantially in parallel", with some allowance for designing and manufacturing tolerance (the same applies hereinafter). The opening-and-closing servo motor 1410 is also arranged so that the load side of the opening-and-closing servo motor 1410 faces outside of the left hand 135*a*. An encoder (not illustrated) arranged in the opening-and-closing servo motor 1410 can be an absolute value encoder. A backup battery 1419 for the absolute value encoder is mounted on the frame 1417.

The right-and-left screw shaft 1420 is supported rotatably on a bearing 1423 that is arranged on the frame 1417 through a guide 1422. The right-and-left screw shaft 1420 is arranged in parallel with the longitudinal direction of the opening-and-closing servo motor 1410 and at a position nearer to the fore end of the left hand 135*a* than the opening-and-closing servo motor 1410. One end and the other end of the right-and-left screw shaft 1420 have screws formed in opposite directions (screws threaded in the right and the left directions). The right-and-left screw shaft 1420 is driven by the opening-and-closing servo motor 1410 through a first belt pulley unit 1433 including at least a timing belt 1430 and a pulley 1431.

The pair of moving units 1440 are caused to move along respective screws formed in the opposing directions on the right-and-left screw shaft 1420. In other words, the pair of the moving units 1440 are carried in the opposite directions along the axial direction of the right-and-left screw shaft 1420 when the right-and-left screw shaft 1420 is rotated. The base ends of the pair of the supporting units 142 are fixed to the corresponding moving units 1440. The moving units 1440 are guided along the guide 1422.

The reciprocating mechanism 1500 includes a reciprocating servo motor 1510, a spline shaft 1520 that transmits the driving force of the reciprocating servo motor 1510, and a pair of spline nut units 1522.

The reciprocating servo motor 1510 is mounted on the frame 1417 at the base end of the left hand 135*a* in the manner so that the longitudinal direction of the reciprocating servo motor 1510 is laid in parallel with the reciprocating axis AXp. The reciprocating servo motor 1510 is arranged to face an opposite direction from the opening-and-closing servo motor 1410. Furthermore, the reciprocating servo motor 1510 is arranged side by side with the opening-and-closing servo motor 1410, when the left hand 135*a* is viewed from the side (viewing from the load side of the reciprocating servo motor 1510 or the opening-and-closing servo motor 1410). Therefore, the size of the left hand 135*a* can be reduced compared with an arrangement where the reciprocating servo motor 1510 and the opening-and-closing servo motor 1410 are not arranged in the manner described above.

An encoder (not illustrated) arranged in the reciprocating servo motor 1510 can be an absolute value encoder. A backup battery 1519 for the absolute value encoder is mounted on the frame 1417.

The spline shaft 1520 is supported rotatably on a bearing 1523 arranged on the frame 1417 at a position nearer to the fore end of the left hand 135*a* than the right-and-left screw shaft 1420. The spline shaft 1520 is also arranged in parallel with the longitudinal direction of the reciprocating servo motor 1510 at a position nearer to the fore end of the left hand 135*a* than the reciprocating servo motor 1510. The spline shaft 1520 is driven by the reciprocating servo motor 1510 through a second belt pulley unit 1533 including at least a timing belt 1530 and a pulley 1531.

The pair of the spline nut units 1522 each include at least a first spline nut 1541 located on an inner circumferential side and a second spline nut 1542 located on an outer circumferential side.

The first spline nut 1541 can move along the axial direction of the spline shaft 1520 by rotating with the spline shaft 1520. The first spline nut 1541 is, for example, a ball spline inner race.

The second spline nut 1542 can move with the first spline nut 1541 along the rotation axis of the spline shaft 1520, and can be rotated relative to the first spline nut 1541 about the rotation axis of the first spline nut 1541. The second spline nut 1542 is fixed to the inner surface of the supporting unit 142 at the base end of the supporting unit 142. The second spline nut 1542 is, for example, a ball spline outer race.

The supporting units 142 each include a third belt pulley unit 1550. The third belt pulley unit 1550 at least includes a pulley 1551 and a pulley 1552 arranged inside of the supporting unit 142, respectively at the base end and the fore end of the supporting unit 142, and a timing belt 1553 stretched across the pulley 1551 and the pulley 1552.

The pulley 1551 is arranged on the outer side of the first spline nut 1541. At the rotation center of the pulley 1551, a hollow is formed. The pulley 1551 is laid along approximately the same axis as the spline shaft 1520 penetrating through the hollow.

The pulley 1552 rotates about the reciprocating axis AXp intersecting with the longitudinal direction of the supporting unit 142. A shaft 1555 rotating about the reciprocating axis AXp has one end fixed to the rotation center of the pulley 1552. The base end of the capturing claw 136 is fixed to the other end of the shaft 1555 inside of the supporting unit 142.

As mentioned earlier, the supporting units 142 have the pair of tool holders 141 (see FIGS. 4A to 4F). Each of the tool holders 141 includes a first connector 1611 and a second connector 1612 both having a plate-like shape.

The thickness of the first connectors 1611 included in the respective supporting units 142 gradually becomes smaller toward the inner side of the supporting units 142, along the side of the first connector 1611 facing the other first connector 1611. The thickness of the second connectors 1612 included in the respective supporting units 142 gradually becomes smaller toward the inner side of the supporting units 142, along the side of the second connector 1612 facing the other second connector 1612.

The first connector 1611 and the second connector 1612 are arranged on the front side of the supporting unit 142, as illustrated in FIG. 4C. The edge of the first connector 1611 along the inner side and the edge of the second connector 1612 along the inner side are formed to extend in directions intersecting with each other when viewed from the inner side of the supporting units 142. In the viewpoint of reducing the size of the tool holders 141, it is preferable to arrange the second connector 1612 adjacent to the first connector 1611.

On the side of the adaptor included in the scraper 115, a first groove and a second groove having V-shaped cross sections each facing a different direction are formed. The first connector 1611 and the second connector 1612 on the tool holder 141 are engaged with the first groove and the second groove, respectively.

By engaging the first connector 1611 into the first groove, the scraper 115 on which the adaptor is fixed is aligned in a direction substantially perpendicular to the direction in which the first groove is formed (the direction in which the edge of the first connector 1611 extends). By engaging the second connector 1612 into the second groove, the scraper 115 is aligned in a direction substantially perpendicular to the direction in which the second groove is formed (the direction in which the edge of the second connector 1612 extends).

Because the first connector 1611 and the second connector 1612 are engaged into the respective grooves having V-shaped cross sections in the manner described above, if the alignment errors are within a range smaller than the half of the groove width when the scraper 115 is held in the left hand 135a, such alignment errors are absorbed, and the scraper 115 can be held in the left hand 135a.

Operations of the left hand 135a (an opening and closing operation and a reciprocating operation of the capturing claws 136) will now be explained.

(Opening and Closing Operation)

As illustrated in FIG. 4G, when the opening-and-closing servo motor 1410 is rotated in one direction, the rotation is transmitted through the first belt pulley unit 1433, causing the right-and-left screw shaft 1420 to rotate. Because right- and left-direction screws are formed on the right-and-left screw shaft 1420, the moving units 1440 are caused to move toward the inner side along the right-and-left screw shaft 1420. As the moving units 1440 are moved, the gap between the supporting units 142, which are fixed to the respective moving units 1440, becomes narrower, and the capturing claws 136 are closed.

The supporting units 142 are fixed to the respective spline nut units 1522 (more specifically, the second spline nuts 1542) included in the reciprocating mechanism 1500. However, the spline nut units 1522 (more specifically, the first spline nuts 1541) can move freely along the spline shaft 1520. Therefore, although the capturing claws 136 are fixed to the spline nut units 1522 included in the reciprocating mechanism 1500, the opening and closing operations of the capturing claws 136 are not prevented. On the contrary, when the opening-and-closing servo motor 1410 is rotated in the opposite direction, obviously, the capturing claws 136 are opened in the manner illustrated in FIG. 4H. Therefore, an explanation thereof will be omitted herein.

(Reciprocating Operation)

As illustrated in FIG. 4G, when the reciprocating servo motor 1510 is rotated in one direction, the rotation is transmitted through the second belt pulley unit 1533, and the spline shaft 1520 is caused to rotate. The rotation of the spline shaft 1520 is transmitted to the first spline nuts 1541 included in the respective spline nut units 1522, and the first spline nuts 1541 are caused to rotate. At this time, because the second spline nuts 1542 can rotate about the axis of the spline shaft 1520 in a manner not associated with the rotation of the first spline nuts 1541 (the spline shaft 1520), the rotation of the first spline nuts 1541 is not transmitted to the supporting units 142.

Figure 4I:
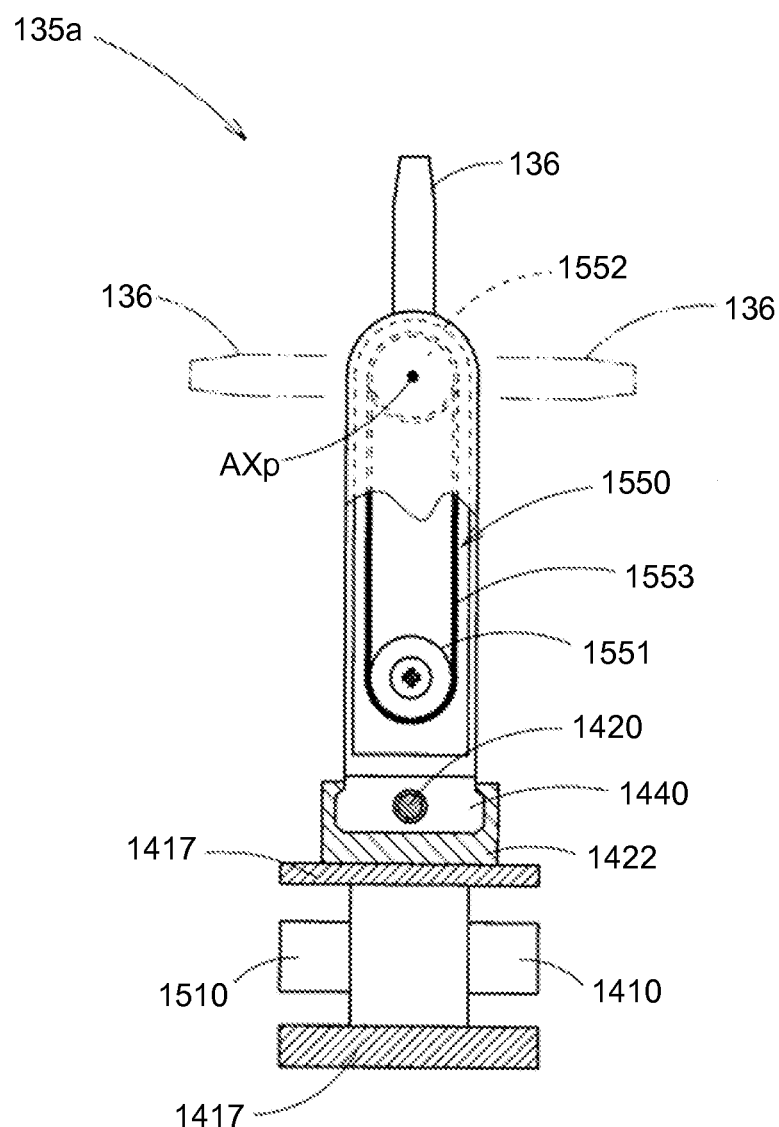
FIG. 4I is a schematic for explaining a reciprocating operation of the capturing claws on the left hand included in the dual-arm manipulator.

When the first spline nuts 1541 are rotated, the pulleys 1551 included in the respective third belt pulley units 1550 are caused to rotate (see FIG. 4I). When the pulleys 1551 are caused to rotate, the pulleys 1552 and the shaft 1555 are reciprocated about the reciprocating axis AXp through the timing belt 1553. As a result, the capturing claws 136 can be reciprocated about the reciprocating axis AXp.

Because the opening-and-closing mechanism 1400 and the reciprocating mechanism 1500 operate independently, the opening and closing operation and the reciprocating operation of the capturing claws 136 can be performed independently.

Figure 9:
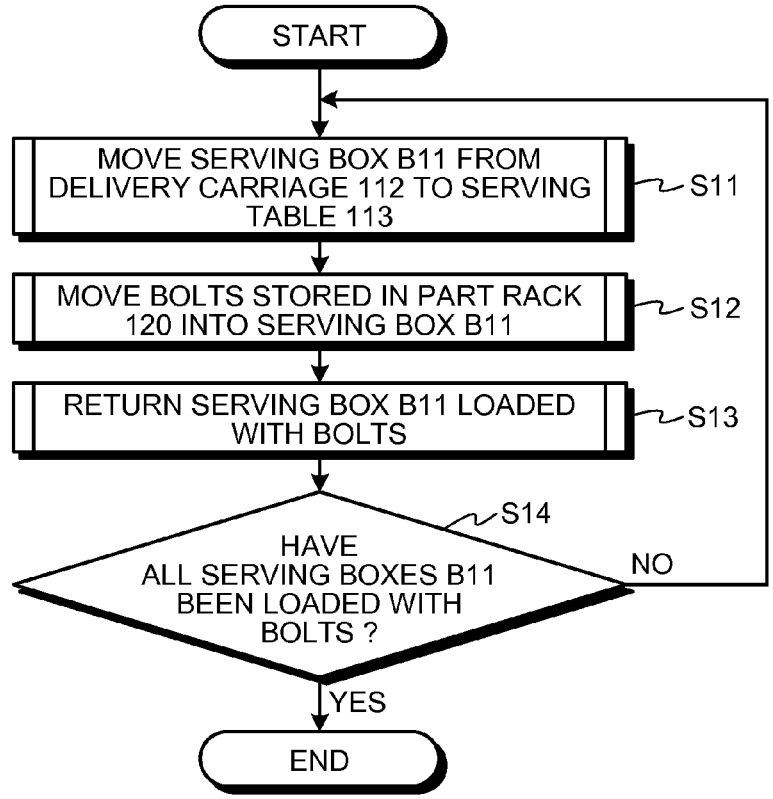
FIG. 9 is a flowchart of a method of picking up the bolts performed by the part picking system having the dual-arm manipulator (Step S11 to S14).

A method for picking up a bolt performed by the part picking system 110 will now be explained. This method for picking up a bolt is generally classified into Steps S11 to S14, as illustrated in FIG. 9. Step S11 is a step at which the dual-arm manipulator 111 moves the serving box B11 from the delivery carriage 112 to the serving table 113. Step S12 is a step at which the dual-arm manipulator 111 moves the bolts stored in the part racks 120 into the serving box B11. Step S13 is a step at which the dual-arm manipulator 111 returns the serving boxes B11 loaded with the bolts. Step S14 is a step for determining whether the operation is to be stopped. Each of Steps S11 to S14 will be explained below one by one.

(Preparation)

An operator carries the delivery carriage 112, on which empty serving boxes B11 are placed, through the gate. As mentioned earlier, the serving boxes B11 can be stacked at five locations, for example, along the outer circumference of the top panel 152 of the delivery carriage 112. However, as illustrated in FIG. 1, one of these locations is kept empty so that the serving boxes B11 loaded with the bolts can be returned. After the delivery carriage 112 is brought in, the air cylinder (not illustrated) lifts the delivery carriage 112, and the delivery carriage 112 is fixed. The operator makes operations on the touch panel 1110 (see FIG. 3) to start up the entire part picking system 110.

(Step S11)

Figure 10:
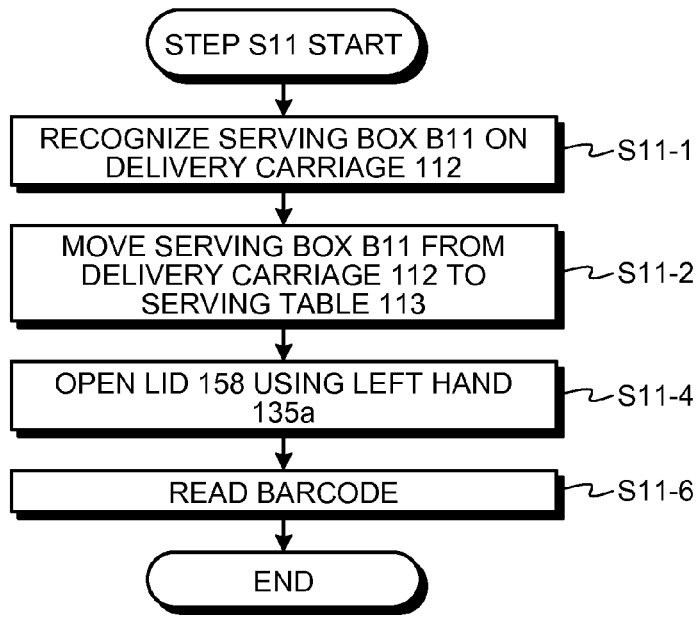
FIG. 10 is a flowchart of main operations performed in the method of picking up the bolts performed by the part picking system having the dual-arm manipulator (Step S11).

To begin with, Step S11 illustrated in FIG. 10 and at which the dual-arm manipulator 111 moves the serving boxes B11 to the serving table 113 will now be explained. In FIG. 10, only main operations are illustrated.

(Step S11-1)

After the system is started, the dual-arm manipulator 111 performs an operation for recognizing the serving box B11 on the delivery carriage 112. The dual-arm manipulator 111 grabs the handle bars 161 on the delivery carriage 112 using the supporting units 142 on the left hand 135a. The dual-arm manipulator 111 then rotates the top panel 152, and moves the empty serving box B11 to be loaded with bolts to a predetermined position.

The dual-arm manipulator 111 then moves the right hand 135b on the right arm 111b above the serving boxes B11 placed on the delivery carriage 112, and lowers the right hand 135b from that position. When the right hand 135b is brought into contact with the serving box B11, the output signal of the right force sensor 133b changes. Therefore, the dual-arm manipulator 111 can recognize that the position where the output signal has changed is where the serving box B11 on the uppermost layer is located. Because the size of the serving box B11 and the height of the top panel 152 are known, the number of layers of the serving boxes B11 can be recognized by recognizing the position of the uppermost serving box B11.

This recognizing operation is repeated for each of the columns, and the system controller 124 recognizes the total number of the serving boxes B11 and the number of the serving boxes B11 in each of the locations on the rotating table 151 via the robot controller 122. In this manner, the positions and the number of the serving boxes B11 are recognized without using any special sensor.

(Step S11-2)

The dual-arm manipulator 111 grabs the handles 156 on the serving box B11 with both of the left hand 135a and the right hand 135b, and lifts the serving boxes B11 along the guiding poles 154 to a position higher than the top ends of the guiding poles 154.

The dual-arm manipulator 111 then rotates the torso 111c, brings down the serving box B11, and places the serving box B11 onto the serving table 113.

(Step S11-3)

If the load sensor arranged on the serving table 113 detects the serving box B11, the system controller 124 determines that the serving box B11 is placed correctly onto the serving table 113, and executes the next step.

On the contrary, if the load sensor does not detect the serving box B11, the system controller 124 determines that some abnormality has occurred, and executes a predetermined alarming process (for example, a temporary stopping process).

(Step S11-4)

The dual-arm manipulator 111 then places the capturing claws 136 on the left hand 135a onto the bottom surface of the handle 159 on the lid 158, and opens the lid 158 by moving the capturing claws 136 upwardly. The lid 158 is supported opened by the supporting member 170, opened by an angle of 100 to 140 degrees from the position where the lid 158 is closed, for example.

(Step S11-5)

If the opening/closing detection sensor arranged on the serving table 113 detects that the lid 158 is opened, the system controller 124 determines that the lid 158 is opened correctly, and executes the next step.

On the contrary, if the opening/closing detection sensor does not detect that the lid 158 is opened, the system controller 124 determines that some abnormality has occurred, and executes a predetermined alarming process.

(Step S11-6)

The barcode reader then reads the two-dimensional barcode pasted on the serving box B11. The read information (the first mapping information) is sent to the system controller 124. If the first mapping information is not received, the system controller 124 determines that some abnormality has occurred, and executes a predetermined alarming process.

(Step S12)

Figure 11:
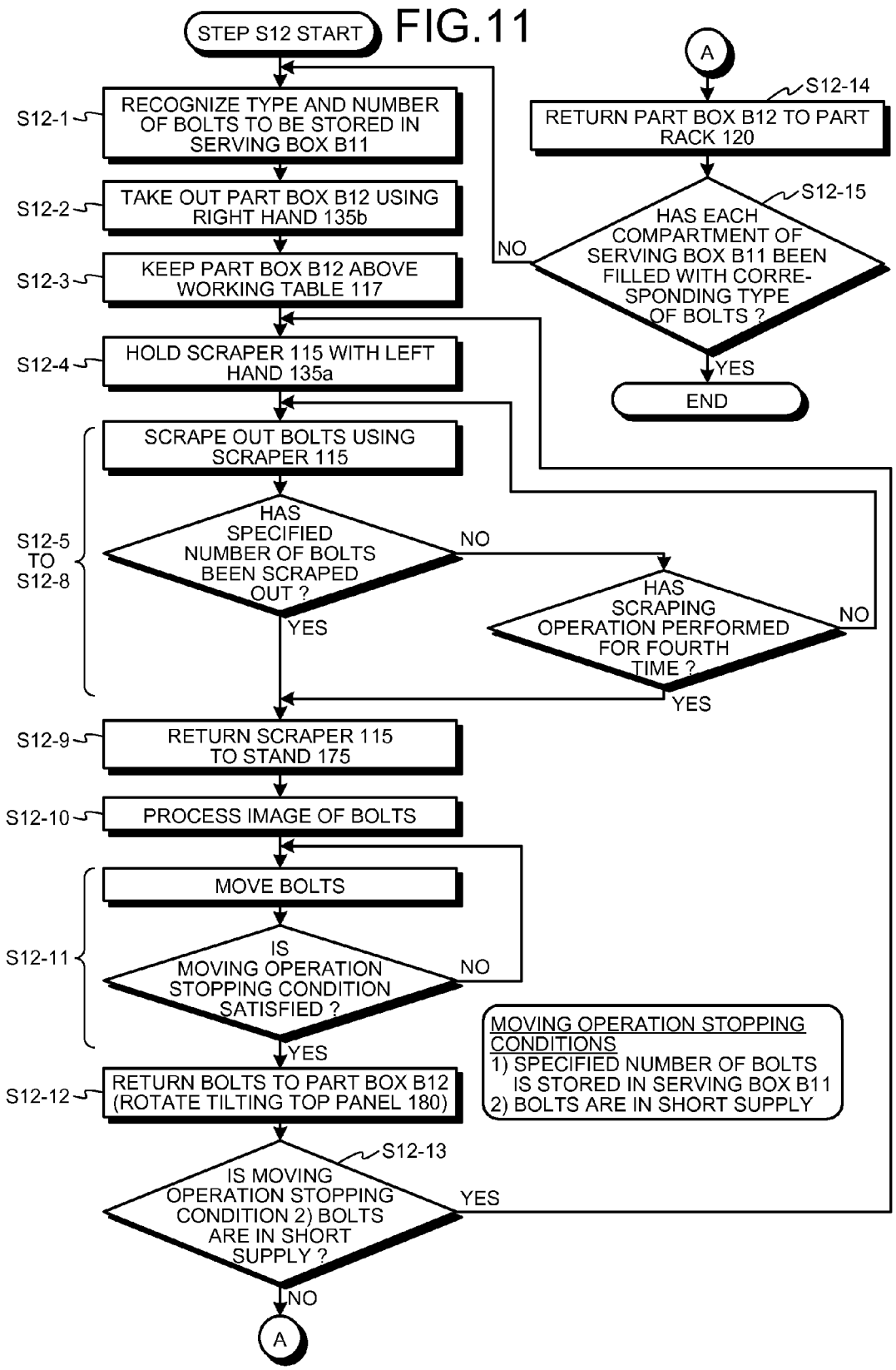
FIG. 11 is a flowchart of main operations performed in the method of picking up the bolts performed by the part picking system having the dual-arm manipulator (Step S12).

Step S12 illustrated in FIG. 11 and at which the dual-arm manipulator 111 moves a bolt stored in the part rack 120 into the serving box B11 placed on the serving table 113 will now be explained. In FIG. 11, only main operations are illustrated.

(Step S12-1)

The system controller 124 recognizes the information about the type and the number of bolts to be stored in each compartment of the serving box B11 on the serving table 113 based on the received first mapping information.

(Step S12-2)

The system controller 124 then issues a command to the robot controller 122 to take out the part box B12 containing the bolts of the corresponding type. The robot controller 122 controls the dual-arm manipulator 111 based on the command. According to the command of the robot controller 122, the dual-arm manipulator 111 rotates the torso 111c, and takes out the corresponding part box B12 stored in a predetermined compartment of the part rack 120. More specifically, the dual-arm manipulator 111 uses the capturing claws 144 on the right hand 135b to capture the rear side plate 1120c of the part box B12 from the vertical directions, and pulls out the part box B12 toward the front to take out the part box B12.

The right force sensor 133b is then used to weigh the bolts in the part box B12. The weight of the part box B12 captured by the dual-arm manipulator 111 for the first time after the part picking system 110 is started is stored in the system controller 124 as an initial weight.

(Step S12-3)

The dual-arm manipulator 111 rotates the torso 111c, and directly faces the working table 117. The dual-arm manipulator 111 then lowers the front side of the captured part box B12, and keeps the part box B12 tilted above the tilting top panel 180 on the working table 117.

(Step S12-4)

The dual-arm manipulator 111 connects the scraper 115 to the tool holders 141 on the left hand 135a to capture the scraper 115 (more specifically, the adaptor) placed on the stand 175.

(Step S12-5)

Figure 7:
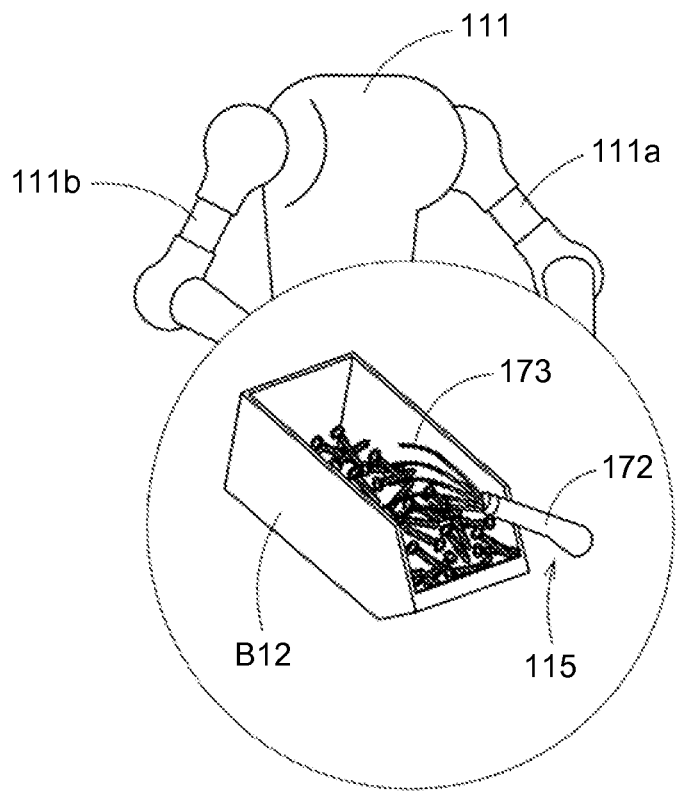
FIG. 7 is a schematic for explaining how the dual-arm manipulator scrapes out bolts.

The dual-arm manipulator 111 performs a scraping operation to scrape out the bolts from the part box B12 onto the tilting top panel 180 using the scraper 115 (see FIG. 7). The scraping operation will now be explained in detail. FIG. 7 is a schematic of how the dual-arm manipulator 111 scrapes out the bolts. The left hand 135a holding the scraper 115 and the right hand 135b holding the part box B12 are omitted in this drawing.

Figure 8A:
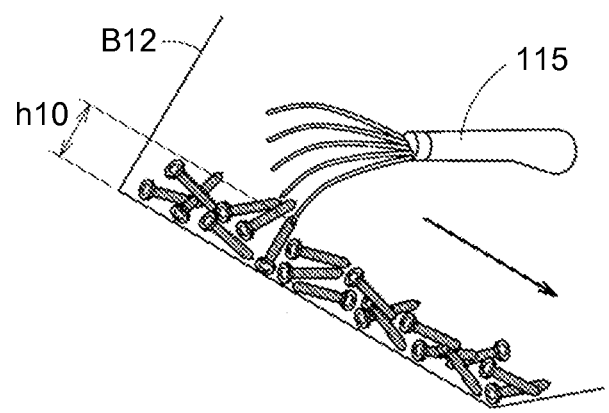
FIGS. 8A and 8B are schematics for explaining the part box and a scraper while the dual-arm manipulator is scraping out the bolts.

When the dual-arm manipulator 111 performs the scraping operation for the first time, the level of the bolts from the bottom of the part box B12 has not yet been exactly measured. Therefore, the scraper 115 is placed into the part box B12 while monitoring the output value of the left force sensor 133a, and the height where the output value of the left force sensor 133a changes, that is, where the scraper 115 is brought into contact with bolts is established as a reference height h10 from the bottom of the part box B12 (see FIG. 8A). The dual-arm manipulator 111 further digs the scraper 115 into a predetermined depth from the reference height h10 (for example, 0 to 5 millimeters), and moves the bolts to the front side of the part box B12 and scrapes out the bolts. The force applied to scrape out the bolts is adjusted based on the measurement of the left force sensor 133a arranged on the left arm 111a. The two-dimensional camera 1100 captures an image of the bolts on the tilting top panel 180, and the image is applied with an image process in the manner to be described later.

Therefore, if the bolts overlap each other, it would be difficult or impossible to detect the positions and the orientations of the bolts in the two-dimensional image. Thus, the bolts thus scraped out are preferably scattered to a degree not overlapping each other on the tilting top panel 180. In the first embodiment, a quantity of bolts that allows the positions and the orientations of the bolts to be detected in an optimal manner is obtained based on experiments and the like and is set in advance, and this predetermined quantity of bolts is scraped out using the scraper 115 with reference to the output value of the left force sensor 133a. Therefore, the possibility of bolts overlapping each other on the tilting top panel 180 can be suppressed, and the positions and the orientations of a larger quantity of bolts can be detected in the two-dimensional image.

The scraper 115 can also be said to be a tool for adjusting the arrangement of the bolts on the tilting top panel 180. This tool is not limited to the scraper 115 as long as such a tool can suppress possibility of the bolts from overlapping each other on the tilting top panel 180 and allows the capturing claws 136 to capture the bolts.

(Step S12-6)

After performing the scraping operation for the first time, if it is determined that the bolts thus scraped out has reached the predetermined quantity, Step S12-9 is executed. The predetermined quantity is obtained based on the output of the right force sensor 133b. Therefore, for example, such a predetermined quantity of bolts can be measured without providing a special sensor such as a weight scale.

Figure 8B:
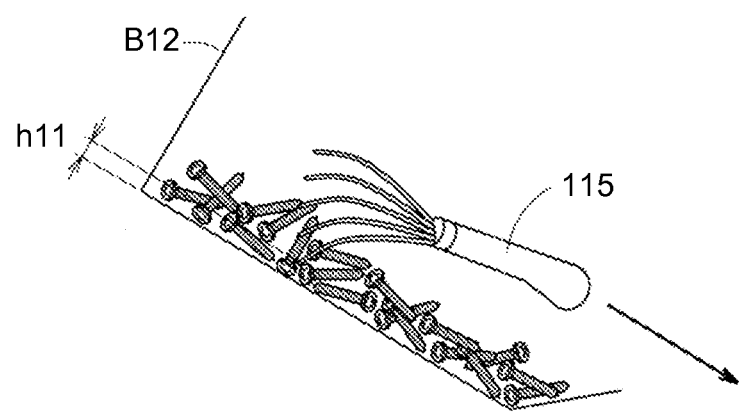

On the contrary, if it is determined that the bolts thus scraped out has not reached the predetermined quantity, the dual-arm manipulator 111 performs the scraping operation for the second time. Upon performing the scraping operation for the second time, the scraper 115 is dug deeper into the bolts than the position where the bolts were scraped out at the first time (e.g., 3 to 10 millimeters) to scrape out the bolts from a height h11 (FIG. 8B).

(Step S12-7)

If it is determined that the bolts thus scraped out has reached the predetermined quantity after performing the scraping operation for the second time, Step S12-9 is executed.

On the contrary, if it is determined that the bolts thus scraped out has not reached the predetermined quantity, the dual-arm manipulator 111 performs the scraping operation for the third time. Upon performing the scraping operation for the third time, the scraper 115 is dug deeper into the bolts than the position where the bolts were scraped out at the second time (e.g., 3 to 10 millimeters) to scrape out the bolts.

(Step S12-8)

If it is determined that the bolts thus scraped out has reached the predetermined quantity after performing the scraping operation for the third time, Step S12-9 is executed.

On the contrary, if it is determined that the bolts thus scraped out has not reached the predetermined quantity, the dual-arm manipulator 111 performs the scraping operation for the fourth time. Upon performing the scraping operation for the fourth time, the scraper 115 is dug deeper into the bolts than the height where the bolts were scraped out at the third time (e.g., 3 to 10 millimeters) to scrape out the bolts.

After performing the scraping operation for the fourth time, Step S12-9 below is executed regardless of whether the bolts thus scraped out has reached the predetermined quantity. In the first embodiment, the upper limit of the number of the times the scraping operation is performed is set to four. However, this upper limit may be set to any number.

(Step S12-9)

The dual-arm manipulator 111 returns the scraper 115 held in the left hand 135a to the stand 175.

(Step S12-10)

The two-dimensional camera 1100 controlled by the system controller 124 captures an image of the same type of bolts scraped out onto the tilting top panel 180. The image processing computer 126 detects the edge of the two-dimensional image of the bolts thus captured, for example, and matches the two-dimensional image against a template of the bolt stored in advance to obtain the position and the orientation of each of the bolts scattered across the tilting top panel 180. The robot controller 122 receives the position and the orientation of each of the bolts thus obtained via the system controller 124.

(Step S12-11)

The robot controller 122 operates the dual-arm manipulator 111 based on the position and the orientation of each of the bolts. The dual-arm manipulator 111 moves the left hand 135a near a bolt to be picked up. The dual-arm manipulator 111 then rotates the entire left hand 135a about a rotation axis AXta, and reciprocates the capturing claws 136 about the reciprocating axis AXp to change the orientation of the bolt so that the bolt can be captured more easily. The dual-arm manipulator 111 then closes the capturing claws 136 to pick up the bolt from the tilting top panel 180. The force for picking up the bolt is controlled by the opening-and-closing servo motor 1410.

In this manner, the dual-arm manipulator 111 can pick up a bolt mainly by rotating the left hand 135a to change the direction of the capturing claws 136, without moving the left arm 111a by a large degree. In other words, the dual-arm manipulator 111 does not need to change the position of the left arm 111a by a large degree to pick up a bolt, compared with a structure in which the capturing claws 136 are not reciprocated about the reciprocating axis AXp. Therefore, the positional change of the left arm 111a required in picking up a bolt and the time required in moving the bolt can be reduced, compared with the structure in which the capturing claws 136 are not reciprocated about reciprocating axis AXp. Furthermore, the range where the dual-arm manipulator 111 can pick up a bolt can be increased.

The dual-arm manipulator 111 then moves the bolt thus picked up into a predetermined compartment of the serving box B11 (the compartment mapped in the first mapping information) based on the first mapping information read from the two-dimensional barcode.

This step is repeated by the number of bolts included in the first mapping information, and the bolts of the same type are stored in the predetermined compartment. While the bolts are being moved by the left hand 135a, the part box B12 held in the right hand 135b is temporarily placed on the part box stand 190 arranged on the working table 117. If the load sensor on the part box stand 190 determines that the part box B12 is not placed on the part box stand 190, the dual-arm manipulator 111 temporarily stops its operation.

This step is repeated until a moving operation stopping condition is satisfied. This moving operation stopping condition is either: 1) the number of bolts indicated by the two-dimensional barcode is stored in the serving box B11, or 2) the bolts on the tilting top panel 180 are in short supply during the moving operation.

(Step S12-12)

When the moving operation stopping condition is satisfied, the dual-arm manipulator 111 grabs the tilting top panel 180 using the supporting units 142 in the left hand 135a, and rotates the tilting top panel 180 about the rotation axis AX14 and tilts the tilting top panel 180. In this manner, the bolts on the tilting top panel 180 are returned to the part box B12 placed on the part box stand 190. At this time, the dual-arm manipulator 111 holds down the part box B12 with the right hand 135b so that the part box B12 does not move. Because the dual-arm manipulator 111 tilts down the tilting top panel 180 to return the bolts into the part box B12 in the manner described above, it is not necessary to provide a special mechanism for returning the bolts to the part box B12.

(Step S12-13)

If the moving operation is stopped because the number of bolts indicated by the two-dimensional barcode is stored in the serving box B11, (when the moving operation stopping condition 1) is satisfied), next Step S12-14 is executed.

On the contrary, if the bolts on the tilting top panel 180 are in short supply during the moving operation (when the moving operation stopping condition 2) is satisfied), Step S12-5 and subsequent steps are performed until the quantity of the bolts reaches the quantity of the bolts indicated by the first mapping information.

(Step S12-14)

The dual-arm manipulator 111 holds the part box B12 using the right hand 135b, and returns the part box B12 to the part rack 120 where the part box B12 was originally stored. After moving the last bolt to the serving box B11 and before returning the part box B12 to the part rack 120 where the part box B12 was originally stored, the system controller 124 measures the weight of the bolts remaining in the part box B12 based on the output signal of the right force sensor 133b arranged on the right arm 111b. Therefore, the weight of the bolts remaining in the part box B12 can be measured without providing a special sensor such as a weight scale.

If the system controller 124 determines that the weight of the remaining bolts is lower than a predetermined weight, the system controller 124 turns on the corresponding lamp on the part rack 120. For example, if the weight of the remaining bolts becomes equal to or less than 80 percent of the initial weight stored at Step S12-2, the system controller 124 turns on the corresponding lamp. In this manner, the operator can check the timing for filling up the bolts to the part box B12.

(Step S12-15)

The system controller 124 determines if each of the compartments in the serving box B11 has been filled with a corresponding type of bolts. If each of the compartments in the serving box B11 has been filled with a corresponding type of bolts, subsequent Step S13 is executed.

If each of the compartments in the serving box B11 has not been filled with a corresponding type of bolts, the dual-arm manipulator 111 repeats Steps S12-2 to S12-14 to move another type of bolts to the serving box B11. At this time, because the left hand 135a of the dual-arm manipulator 111 has the capturing claws 136 that can be opened and closed, the same left hand 135a can be used to capture a bolt of another type (a bolt with a different diameter). In other words, it is not necessary to prepare separate hands for capturing bolts of different diameters, and the same hand can be used to capture any bolt.

(Step S13)

Figure 12:
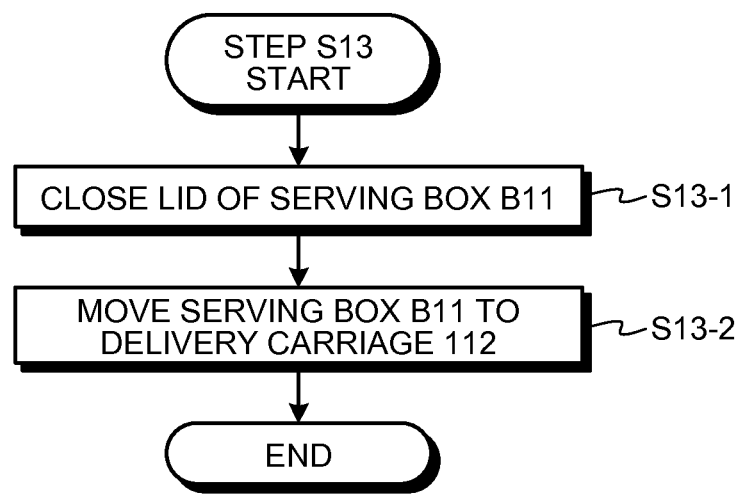
FIG. 12 is a flowchart of operations performed in the method of picking up the bolts performed by the part picking system having the dual-arm manipulator (Step S13).

Step S13 illustrated in FIG. 12 and at which the dual-arm manipulator 111 returns the serving box B11 loaded with the bolts will now be explained.

(Step S13-1)

The dual-arm manipulator 111 bends down the capturing claws 136 on the left hand 135a. The dual-arm manipulator 111 rests the capturing claws 136 on the handle 159 arranged on the lid 158 that is supported by the supporting member 170, and moves the handle 159 forward to close the lid 158.

(Step S13-2)

To place the serving box B11 on the empty space on the delivery carriage 112, the dual-arm manipulator 111 grabs the handle bars 161 using the left hand 135a, rotates the top panel 152 of the rotating table 151, and moves the top panel 152 to a predetermined position.

The dual-arm manipulator 111 rotates the torso 111c to the direction of the delivery carriage 112, while lifting the serving box B11 by holding the handles 156 on the serving box B11 with the left hand 135a and the right hand 135b. The dual-arm manipulator 111 lowers the serving box B11 along the guiding poles 154, and places the serving box B11 onto the top panel 152 of the rotating table 151.

(Step S14)

After completing Step S13-2, the part picking system 110 repeats Steps S11-2 to S13-2 for each one of the serving boxes B11 placed on the delivery carriage 112 (see FIG. 9).

In this manner, through Steps S11 to S14, the part picking system 110 can take out bolts of a required type in a required number from the part racks 120, and store the bolts in the serving box B11 placed on the delivery carriage 112 using the two-dimensional camera 1100 and the dual-arm manipulator 111. These series of operations may be performed in parallel when possible, instead of being performed sequentially. The delivery carriage 112 on which the serving boxes B11 storing therein the bolts are placed is carried through the gate.

The present invention is not limited to the first embodiment described above, and may be modified within a scope not deviating from the spirit of the present invention. For example, any combinations or variations of a part or a whole of the structures according to the first embodiment are within the technical scope of the present invention.

The serving boxes B11 are carried on the delivery carriage 112. However, the serving boxes B11 may also be carried by a conveyor. An information storage unit is not limited to a two-dimensional barcode. Another example of the information storage unit is an integrated circuit (IC) tag, and an IC tag reader may be used instead of the barcode reader.

It should be obvious that the parts are not limited to bolts. Another example of the parts is electrical components. The left arm 111a and the right arm 111b are not limited to a multi-joint manipulator having seven axes, and may be any multi-joint manipulator having seven or more axes. Furthermore, to mention by limiting to the part moving operation, the robot may be a direct drive robot including the left hand 135a.

The first belt pulley unit 1433 may be replaced by a rotation transmitting unit including at least a gear such as a spur gear. The opening-and-closing servo motor 1410 or the reciprocating servo motor 1510 is not limited to an electromagnetic motor, and may be a pneumatic motor.

A second embodiment will now be explained.

Figure 13:
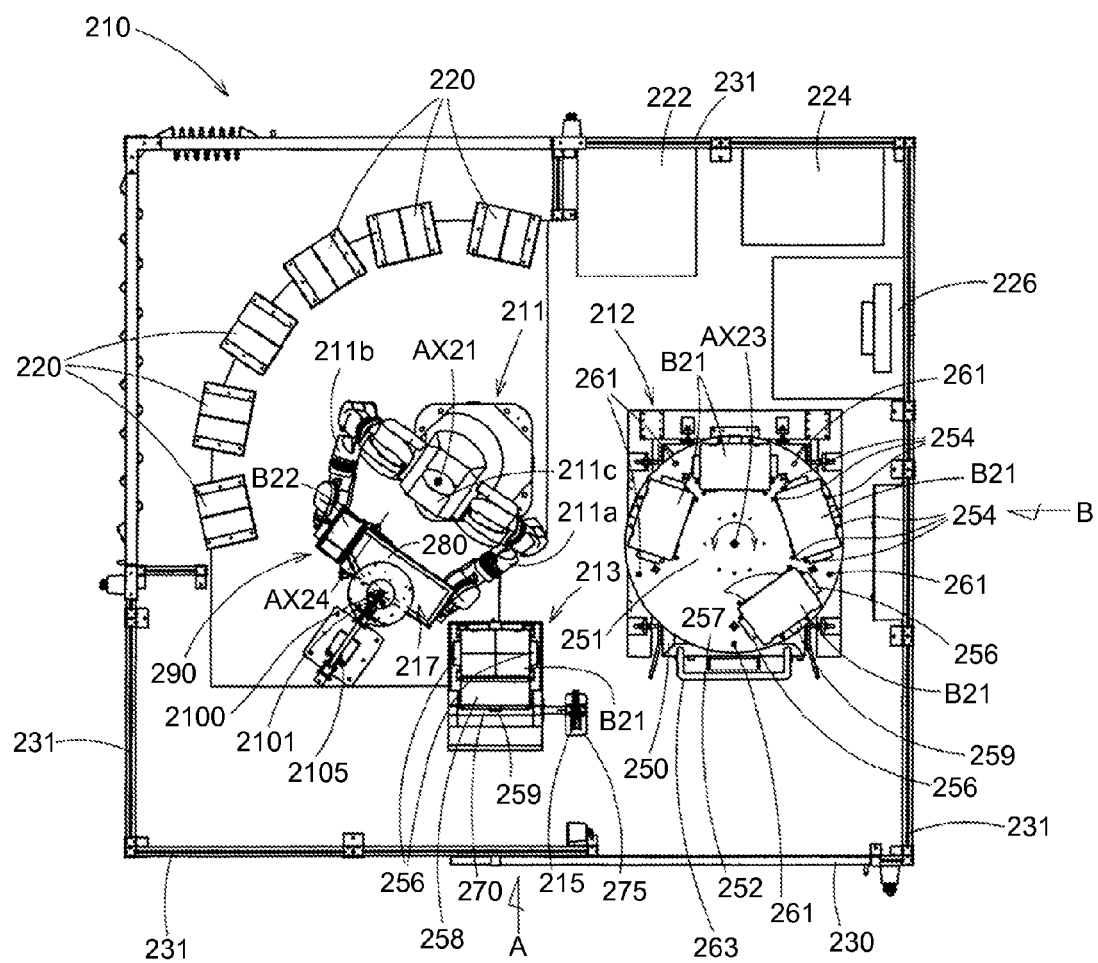
FIG. 13 is a plan view of a part picking system including a dual-arm manipulator according to a second embodiment.

As illustrated in FIG. 13, a part picking system 210 includes a dual-arm manipulator (an example of a robot) 211 according to the second embodiment, a serving table 213, a scraper 215, a working table 217, a two-dimensional camera 2100, and a plurality of part racks 220. The part picking system 210 further includes a robot controller 222, a system controller 224, and an image processing computer 226.

Among these elements, the serving table 213, the working table 217, and the part racks 220 are arranged sequentially around the dual-arm manipulator 211 in the clockwise direction. It is especially preferable for each of the part racks 220 to be arranged along substantially the same circumference about a rotation axis AX21 of a torso 211c of the dual-arm manipulator 211 (an axis intersecting with a surface where the dual-arm manipulator 211 is installed). By arranging the serving table 213, the working table 217, and the part racks 220 in this manner, the flow line of the dual-arm manipulator 211 is shortened and the dual-arm manipulator 211 is enabled to operate efficiently.

Figure 14:
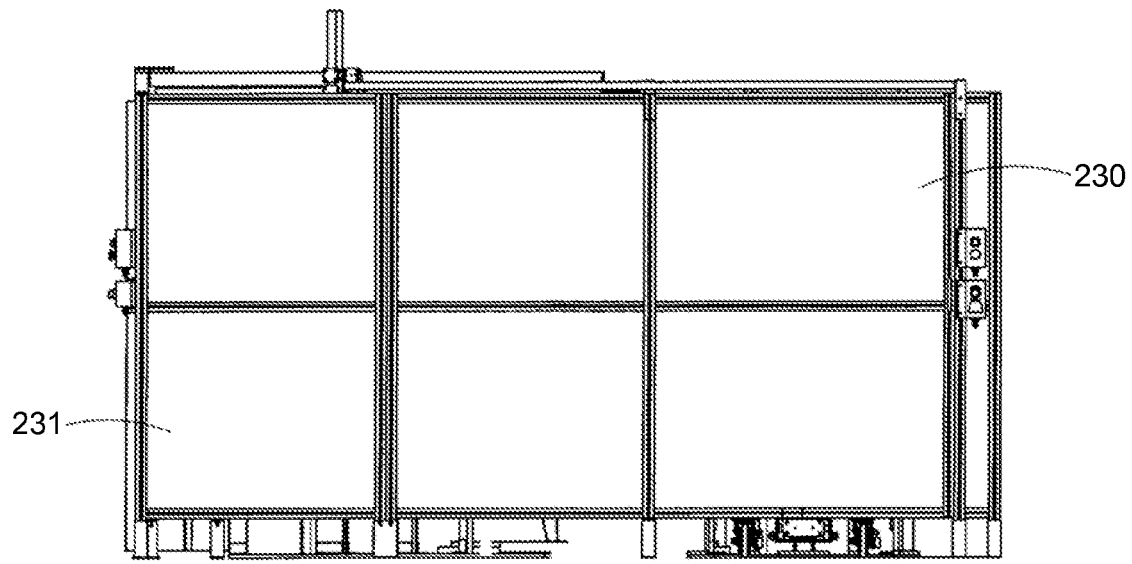
FIG. 14 is a front view of the part picking system including the dual-arm manipulator (a view seen in the direction of the arrow A in FIG. 13).
Figure 15:
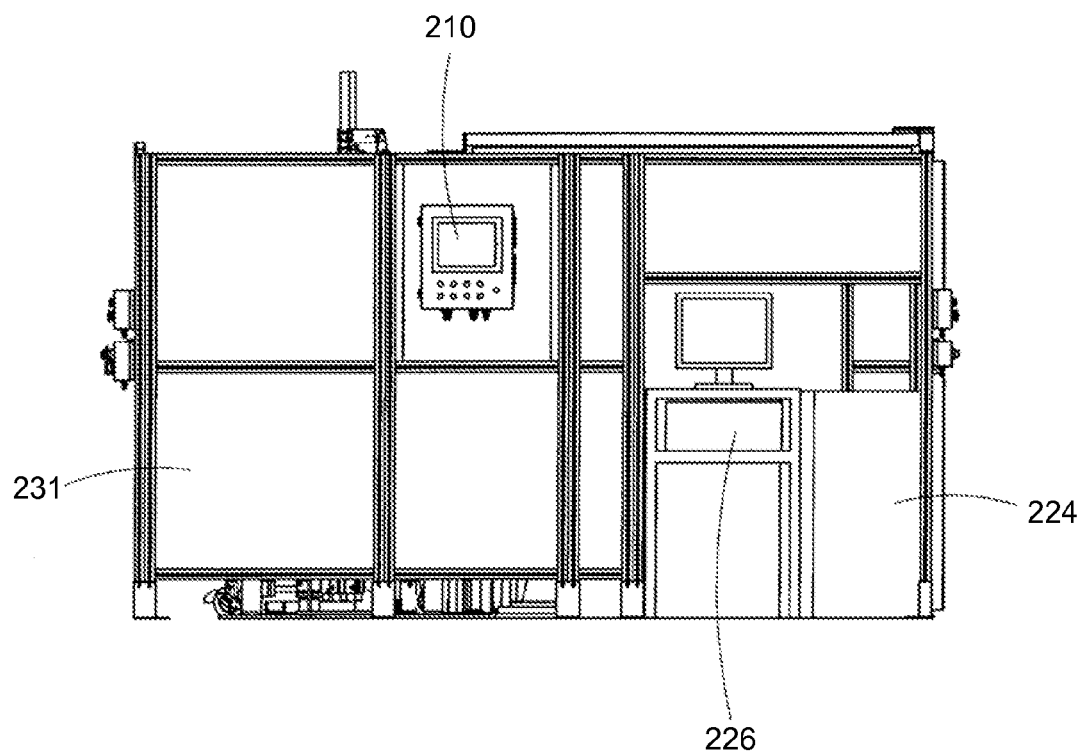
FIG. 15 is a side view of the part picking system including the dual-arm manipulator (a view seen in the direction of the arrow B in FIG. 13).

Using the dual-arm manipulator 211, the part picking system 210 can take out a required type of bolts (an example of a part) in the required quantity from the part racks 220, and store the bolts in serving boxes B21 stacked in plurality on a delivery carriage 212. The part picking system 210 is surrounded by a protection wall 231 having a gate with a sliding door 230 as illustrated in FIGS. 13 to 15.

The dual-arm manipulator 211 has a left arm 211a and a right arm 211b arranged on the left side and the right side of the rotatable torso 211c, respectively. Each of the left arm 211a and the right arm 211b is a multi-joint manipulator having seven joint axes, for example.

Figure 16A:
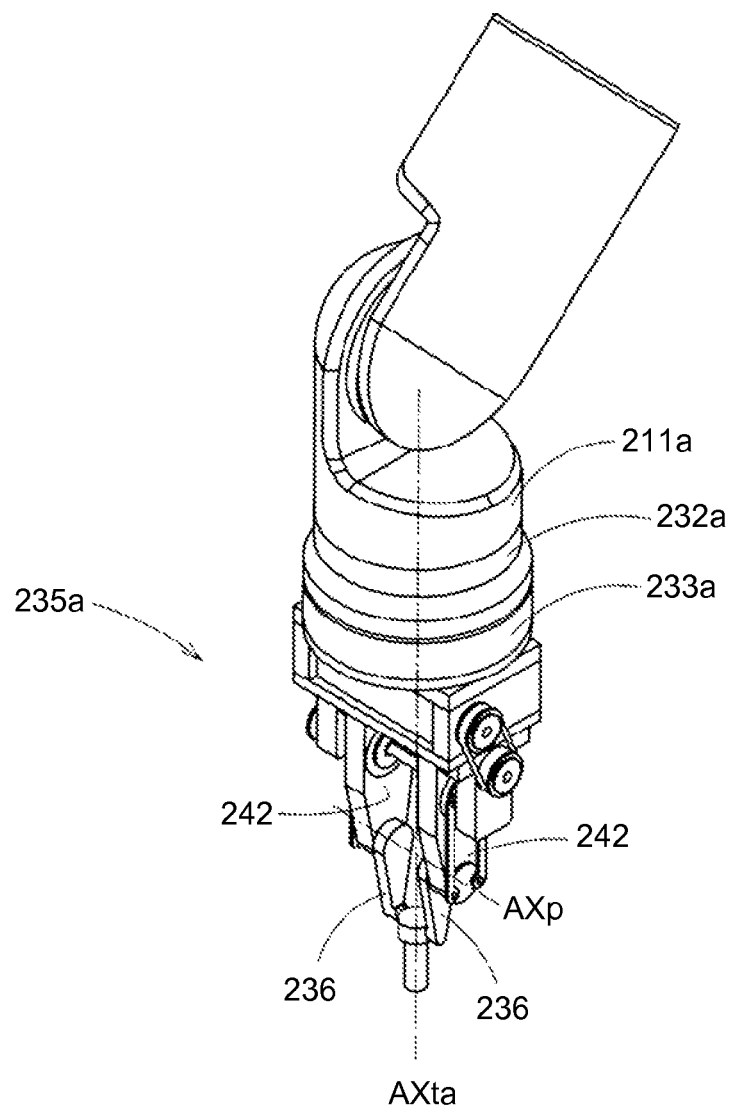
FIG. 16A is a perspective view of the fore end of a left arm included in the dual-arm manipulator.
Figure 16B:
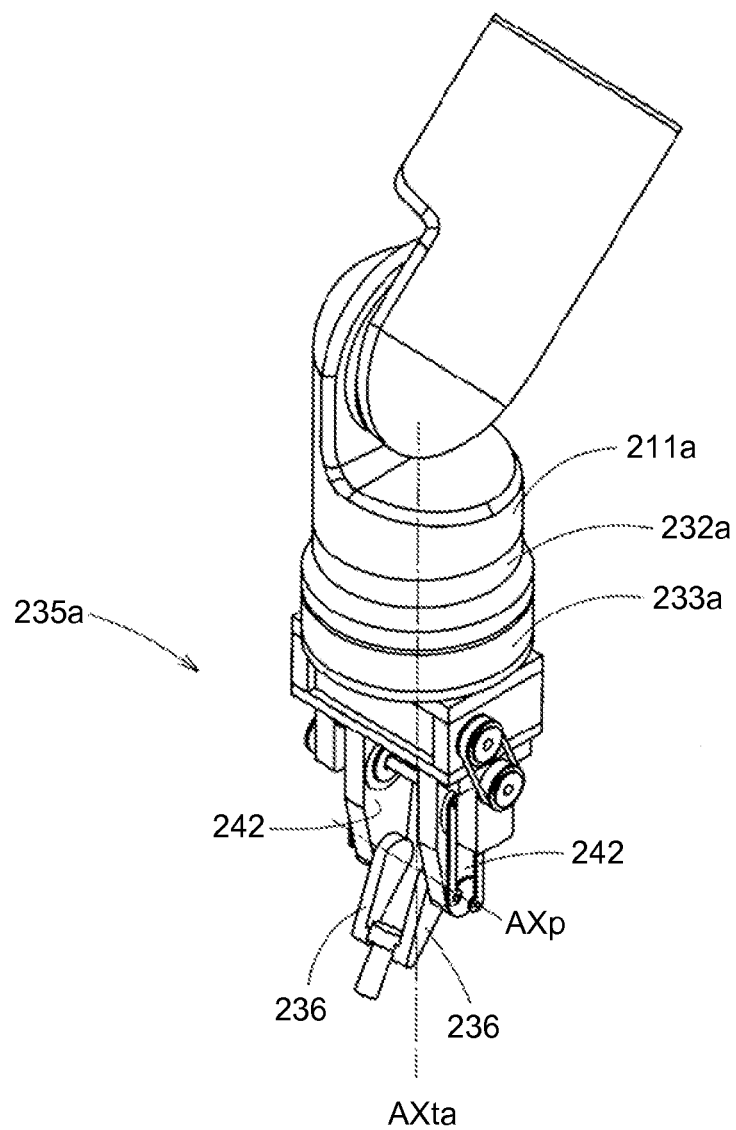
FIG. 16B is a perspective view of the fore end of the left arm included in the dual-arm manipulator, when the tip of capturing claws on the left hand is faced a different direction.

A left hand (an example of a hand) 235a is attached to a wrist flange 232a arranged on the fore end of the left arm 211a via a left force sensor 233a, as illustrated in FIGS. 16A and 16B. The left hand 235a includes a pair of capturing claws 236, and a pair of tool holders (not illustrated) for holding the scraper 215 to be described later.

The capturing claws 236 are supported on the inner fore ends of a pair of supporting units 242 extending along the direction of the rotation axis AXta, for example. The capturing claws 236 can change the direction of the tips thereof by being reciprocated about the reciprocating axis AXp that intersects with the longitudinal direction of the supporting units 242. The capturing claws 236 are configured to be openable and closable along the reciprocating axis AXp as the supporting units 242 are opened and closed.

Figure 16C:
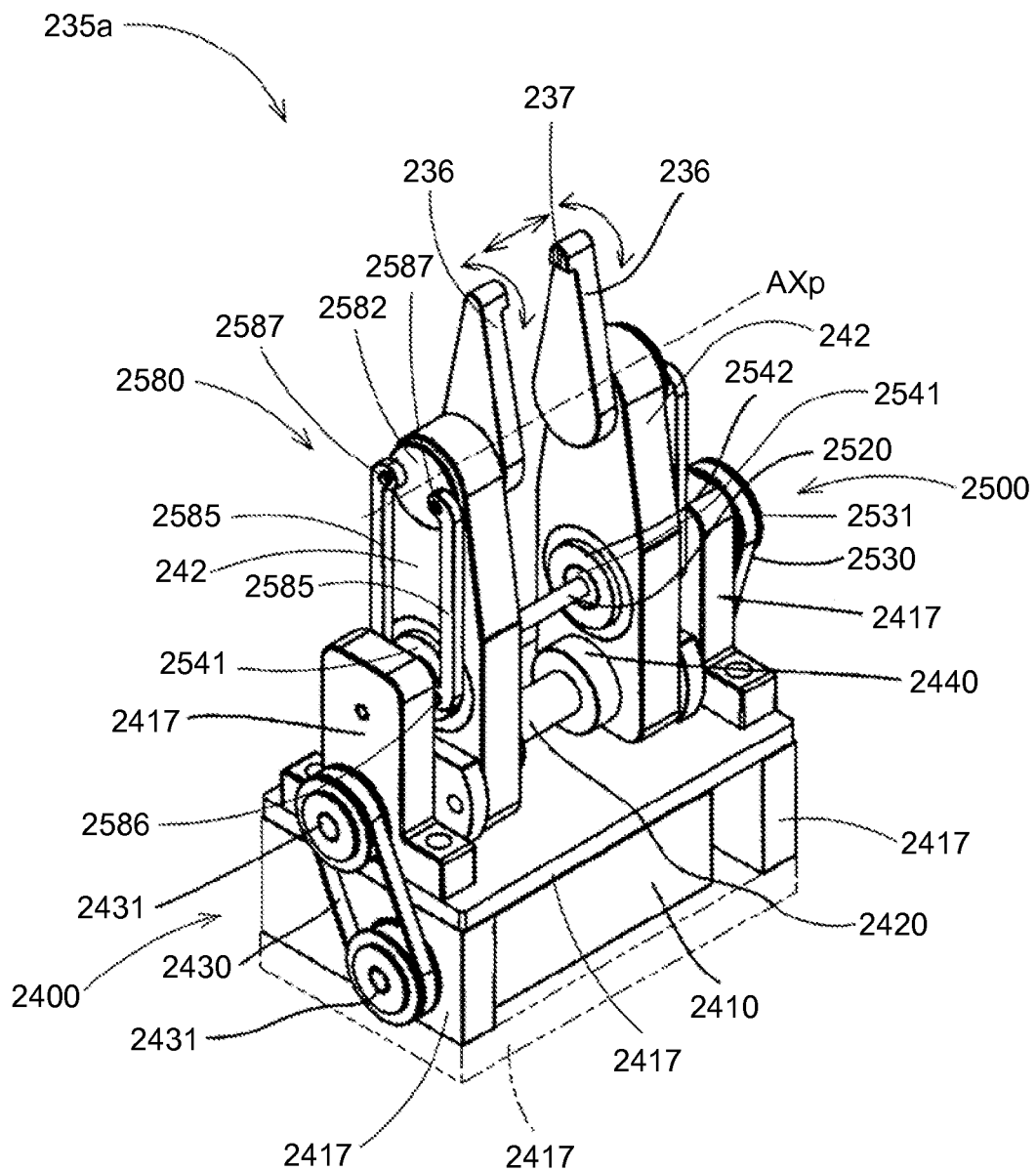
FIG. 16C is a perspective view of the left hand included in the dual-arm manipulator.
Figure 16D:
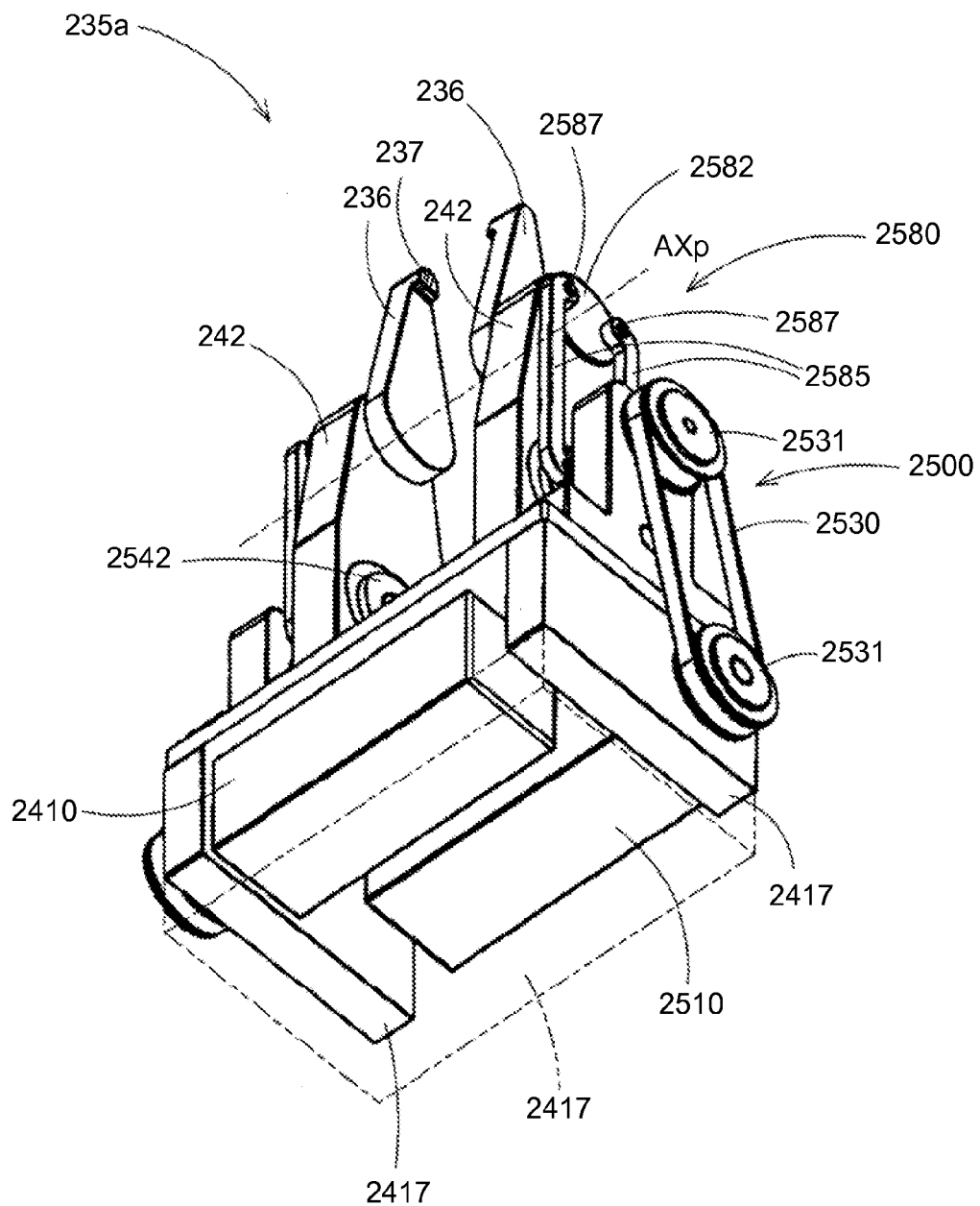
FIG. 16D is a perspective view of the left hand included in the dual-arm manipulator seen from a different angle from that in FIG. 16C.

The thickness of each of the capturing claws 236 is gradually reduced toward the tip, when the left hand 235a is viewed from the side. The tip of each of the capturing claws 236 protrudes inwardly. On the protrusion, a groove 237 (see FIGS. 16C and 16D) having a V-shaped cross section, for example, extending in the direction toward the tip of the capturing claw 236 is formed. A bolt is captured by these grooves 237. The tool holders are arranged on the pair of respective supporting units 242 so that the tool holders are opened and closed when the capturing claws 236 are opened and closed.

Figure 17:
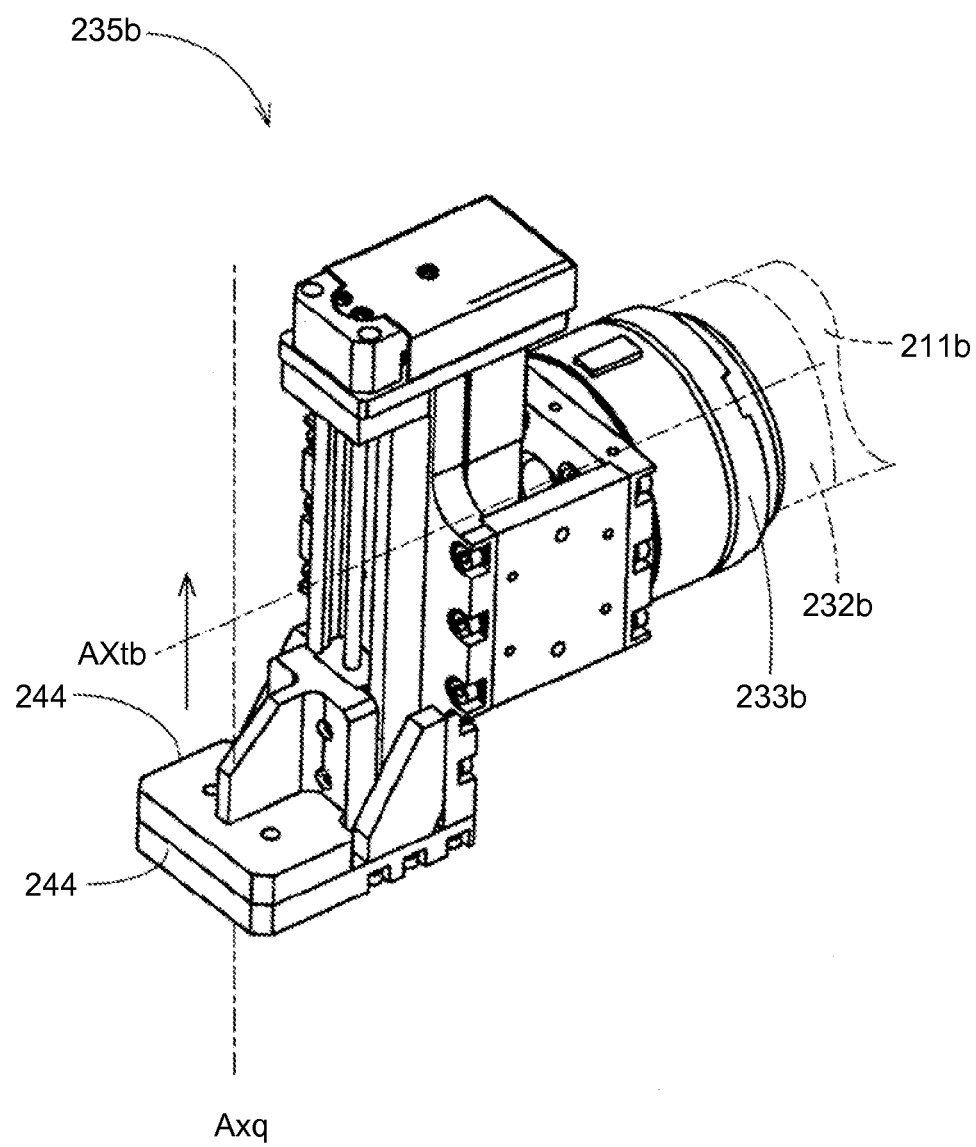
FIG. 17 is a perspective view of a right hand included in the dual-arm manipulator.

A right hand 235b is attached to a wrist flange 232b arranged on the fore end of the right arm 211b via a right force sensor 233b, as illustrated in FIG. 17. The right hand 235b can hold a part box B22 containing bolts. The right hand 235b includes a pair of capturing claws 244 for nipping and holding the rear side of the part box B22 in the vertical directions. The capturing claws 244 are configured to be openable and closable in the direction of the opening-and-closing axis AXq intersecting with the rotation axis AXtb of the wrist flange 232b. In FIG. 17, the capturing claws 244 are depicted as closed. The left force sensor 233a and the right force sensor 233b are connected to the system controller 224 via the robot controller 222.

The delivery carriage 212 will now be explained. The delivery carriage 212 can be used to carry the serving box B21 for storing therein a bolt captured by the dual-arm manipulator 211. The delivery carriage 212 includes a carriage frame 250, and a rotating table 251 supported on the carriage frame 250 and rotating about a vertical axis AX23.

Wheels (not illustrated) are attached to the bottom of the carriage frame 250. A determining unit (not illustrated) for determining a rotation angle of the rotating table 251 and a fixing unit (not illustrated) for fixing the position of the angular position of the rotating table 251 are also mounted on the carriage frame 250.

The rotating table 251 includes a disk-shaped top panel 252. The top panel 252 can hold a plurality of serving boxes B21 along the outer circumference of the top panel 252, e.g., at five locations thereof. The serving boxes B21 are aligned horizontally by a plurality of guiding poles 254 extending from the top panel 252 in an upward direction, and are stacked by ten layers, for example.

The serving box B21 is a container partitioned into a plurality of compartments (e.g., four compartments as illustrated in the serving box B21 placed on the serving table 213), and having handles 256 respectively arranged on the right side and the left side. A lid 258 supported rotatably by a hinge 257 on the rear side of the serving box B21 and opening upwardly is arranged on the top surface of the serving box B21. A handle 259 protruding toward the front is arranged on the lid 258. The serving box B21 is, for example, a part box made of resin. A predetermined type of bolts is stored in each compartment of the serving box B21.

Pasted on the rear surface of the serving box B21 is a two-dimensional barcode, not illustrated, storing therein first mapping information that establishes a mapping relationship between each of the compartments of the serving box B21 and a type (e.g., a diameter, a length, and a material of the bolts) and a quantity of the bolts to be stored in the compartment. The two-dimensional barcode may be a one-dimensional barcode, instead. Because the two-dimensional barcode storing therein the first mapping information is directly pasted on the serving box B21, the mapping relationship between the serving box B21 and the bolts to be stored in the serving box B21 is made clear.

A plurality of handle bars 261 extending upwardly are arranged on the top panel 252. The dual-arm manipulator 211 can use the supporting units 242 on the left hand 235a to hold the handle bars 261 and to rotate the rotating table 251 about the vertical axis AX23.

Furthermore, the delivery carriage 212 is provided with a bar 263. An operator can hold the bar 263 upon moving the delivery carriage 212. The operator carries in and out the delivery carriage 212 on which the serving boxes B21 are placed through the gate with the sliding door 230. When the delivery carriage 212 arrives at a predetermined position, the delivery carriage 212 is lifted from the bottom by an air cylinder not illustrated. As a result, the delivery carriage 212 is fixed while the wheels are lifted above the floor.

The serving table 213 is a table on which the serving box B21 moved from the delivery carriage 212 by the dual-arm manipulator 211 is placed. The bolts, taken out by the dual-arm manipulator 211 from the part box B22 stored in the part rack 220, are moved to the serving box B21 on the serving table 213.

The serving table 213 is provided with a load sensor (not illustrated) for detecting whether the serving box B21 is placed on the serving table 213, an opening/closing detection sensor (not illustrated) for detecting whether the lid 258 of the serving box B21 on the serving table 213 is open or closed, and a barcode reader (not illustrated) for reading the two-dimensional barcode pasted on the serving box B21. The load sensor, the opening-or-closing detection sensor, and the barcode reader are connected to the system controller 224. The serving table 213 is further provided with a supporting member 270 for supporting the lid 258 of the serving box B21.

The scraper 215 is a tool for allowing the dual-arm manipulator 211 to scrape out the bolts stored in the part box B22 onto the working table 217. The scraper 215 has a haft 272, and a scraping claw 273 arranged at the fore end of the haft 272. The scraping claw 273 is made from a plurality of metallic rods, each curving from its root toward its tip (see FIG. 19). The haft 272 has an adaptor (not illustrated) mounted thereon for being connected to the tool holders on the left hand 235a. The scraper 215 is placed on a stand 275.

The working table 217 is placed within a movable range of the dual-arm manipulator 211, and is a table on which the dual-arm manipulator 211 picks up the bolts that are scraped out of the part box B22. The working table 217 has a tilting top panel 280 on which the bolts thus scraped out are placed, and a part box stand 290 on which the part box B22 is temporarily placed. The tilting top panel 280 is a rectangular plate member, for example. The tilting top panel 280 can be rotated about a rotation axis AX24 being approximately horizontal and intersecting with the longitudinal direction of the tilting top panel 280, and laid along an end of the tilting top panel 280. The part box stand 290 is arranged beside the tilting top panel 280 where the rotation axis AX24 is laid.

Therefore, when the dual-arm manipulator 211 picks up the other end of the tilting top panel 280, the tilting top panel 280 is tilted about the rotation axis AX24, and the bolts placed on the tilting top panel 280 are returned to the part box B22, which is temporarily placed on the part box stand 290. The part box stand 290 has a load sensor (not illustrated) for detecting whether the part box B22 is placed thereon.

The two-dimensional camera 2100 is placed above the tilting top panel 280 so that the two-dimensional camera 2100 can capture a two-dimensional image of the bolts placed on the working table 217. The two-dimensional camera 2100 is a two-dimensional monochromatic camera with four million pixels, for example. The two-dimensional camera 2100 is supported on a stand 2105 so that the vertical position thereof can be adjusted.

An illumination device 2101 for ensuring an imaging illuminance for the two-dimensional camera 2100 is arranged on the stand 2105. The two-dimensional camera 2100 is connected to the image processing computer 226. The image captured by the two-dimensional camera 2100 is transmitted to the image processing computer 226. The two-dimensional camera 2100 is also connected to the system controller 224, and operations such as image capturing are controlled by the system controller 224.

The part rack 220 is a rack for storing therein a plurality of part boxes B22. The part rack 220 is partitioned into a plurality of compartments along the vertical and horizontal directions, and has openings on the front and to the rear sides. Therefore, the dual-arm manipulator 211 can take out the part box B22 from the front side of the part rack 220. An operator can pull out the part box B22 from the rear side of the part rack 220.

Figure 18:
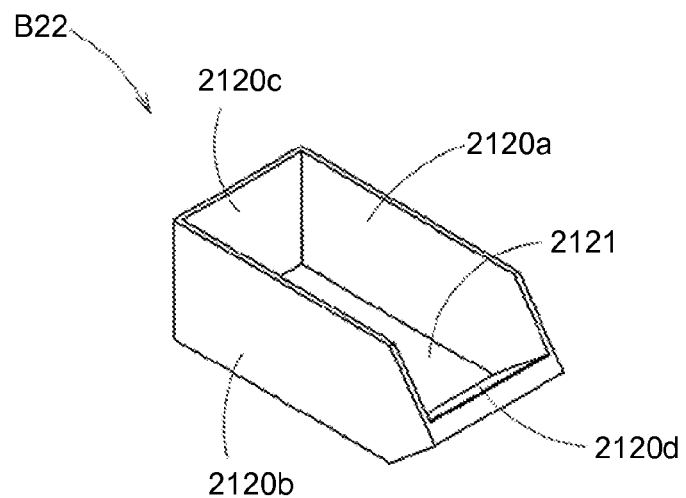
FIG. 18 is a perspective view of a part box held by the dual-arm manipulator.

The part box B22 is formed of a right side plate 2120a, a left side plate 2120b, and a rear side plate 2120c respectively extending upwardly from edges on the right side, the left side, and the rear side of a rectangular-shaped bottom plate 2121, as illustrated in FIG. 18. A front side plate 2120d is titled to the front, and has a smaller length from the edge of the bottom plate 2121 to the end of the front side plate 2120d than corresponding lengths in the right side plate 2120a, the left side plate 2120b, and the rear side plate 2120c. In other words, the part box B22 opens to the top and to an upper portion of the front side. Although details will be described later, the dual-arm manipulator 211 scrapes out the bolts from the front side of the part box B22.

Each of the part racks 220 is partitioned into compartments in two columns and five rows, for example, and each part box B22 storing therein a different type of bolts is stored in each of the compartments. Therefore, when each of the part racks 220 is partitioned into compartments of two columns and five rows, 60 types of bolts can be stored in total in the part racks 220 across the entire part picking system 210 illustrated in FIG. 13.

The part box B22 is stored so that the rear side thereof faces the dual-arm manipulator 211 (so that the front side of the part box B22 faces outside of the part picking system 210). Second mapping information indicating which part box B22 storing therein what type of bolts is kept in which compartment is stored in the system controller 224 in advance.

A process of storing the second mapping information in the system controller 224 will now be explained in detail. As a job before storing the second mapping information, operation instruction data for the dual-arm manipulator 211, including the position of each of the compartments, is stored in the robot controller 222.

By contrast, pasted on each of the part boxes B22, which is stored in each of the part racks 220, is a barcode (or may be a two-dimensional barcode) having information about the type of bolts that are stored therein. The dual-arm manipulator 211 causes the barcode reader arranged on the serving table 213 to read the barcode on each of the part boxes B22. The dual-arm manipulator 211 then stores the part boxes B22 in the respective compartments based on the operation instruction data. At this time, the information stored in the barcode pasted on each of the part boxes B22 (information storing therein at least the information about the type of bolts) is mapped to the position of each of the compartments, and the information is stored in the system controller 224 as the second mapping information.

A lamp (not illustrated) indicating that the quantity of the bolts in the part box B22 has become smaller than a predetermined quantity is arranged by each of the compartments on the rear side of the part rack 220. When this lamp turns on, an operator can pull out the corresponding part box B22 from the rear side of the part rack 220, and fill the part box B22 with the bolts.

The robot controller 222 is connected to the dual-arm manipulator 211, and is capable of controlling the operations of the dual-arm manipulator 211.

The system controller 224 is connected to the robot controller 222, and is capable of controlling the entire part picking system 210. In particular, the system controller 224 is capable of controlling the lamps to turn on. An operator can operate the system controller 224 with a touch panel 2110 (see FIG. 15). The system controller 224 includes, for example, a programmable logic controller.

The image processing computer 226 is connected to the two-dimensional camera 2100 and to the system controller 224, and is mainly capable of processing the images captured by the two-dimensional camera 2100.

The left hand 235a will now be explained in detail with reference to FIGS. 16A to 16G. As mentioned earlier, the capturing claws 236 on the left hand 235a open and close along the directions of the reciprocating axis AXp, and are capable of picking up a bolt. The capturing claws 236 reciprocate about the reciprocating axis AXp to change the direction of the tip of the capturing claws 236. The former operation, which is the opening and closing operations of the capturing claws 236 (the supporting units 242), is realized by an opening-and-closing mechanism 2400, and the latter operation of changing the direction of the capturing claws 236 is realized by a reciprocating mechanism 2500.

(Opening-and-Closing Mechanism)

Figure 16E:
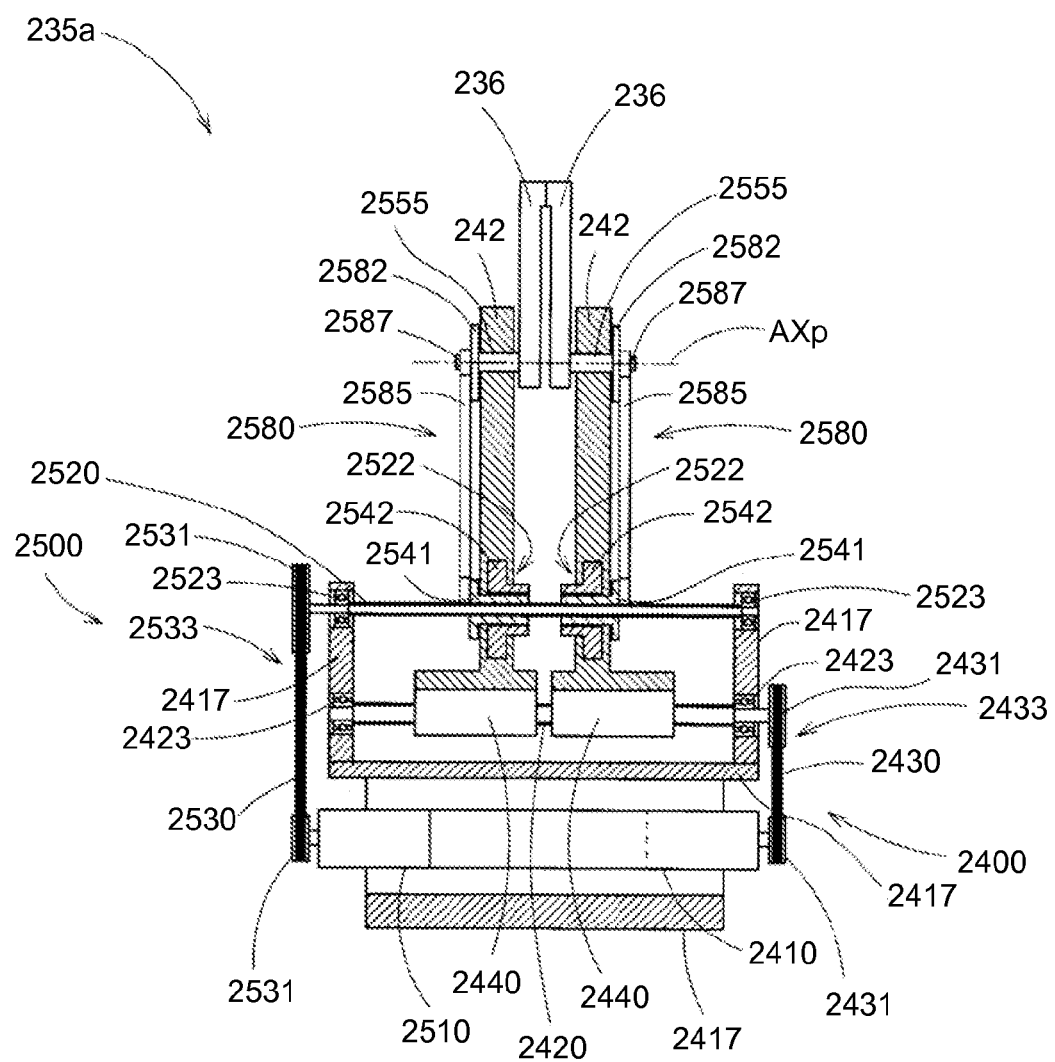
FIG. 16E is a schematic illustrating an internal structure of the left hand included in the dual-arm manipulator with the capturing claws closed.

As illustrated in FIG. 16E, the opening-and-closing mechanism 2400 includes an opening-and-closing servo motor 2410, a right-and-left screw shaft 2420 rotated by the opening-and-closing servo motor 2410, and a pair of moving units 2440 that are moved to opposite directions by rotation of the right-and-left screw shaft 2420.

The opening-and-closing servo motor 2410 is mounted on a frame 2417 in the base of the left hand 235a so that the longitudinal direction of the opening-and-closing servo motor 2410 is laid in parallel with the reciprocating axis AXp. Being in "parallel" herein does not necessarily mean being in parallel in an exact sense. In other words, being in "parallel" means being "substantially in parallel", with some allowance for designing and manufacturing tolerance (the same applies hereinafter). The opening-and-closing servo motor 2410 is also arranged so that the load side thereof faces outside of the left hand 235a. An encoder (not illustrated) arranged in the opening-and-closing servo motor 2410 can be an absolute value encoder. A backup battery (not illustrated) for the absolute value encoder is mounted on the frame 2417.

A right-and-left screw shaft 2420 is supported rotatably on a bearing 2423 that is arranged on the frame 2417. The right-and-left screw shaft 2420 is arranged in parallel with the longitudinal direction of the opening-and-closing servo motor 2410 and at a position nearer to the fore end of the left hand 235a than the opening-and-closing servo motor 2410. One end and the other end of the right-and-left screw shaft 2420 have screws formed in opposite directions (screws threaded in the right and the left directions). The right-and-left screw shaft 2420 is driven by the opening-and-closing servo motor 2410 through a first belt pulley unit (an example of a rotation transmitting unit) 2433 at least including a timing belt 2430 and a pulley 2431.

The pair of moving units 2440 are caused to move along respective screws formed in the opposing directions on the right-and-left screw shaft 2420. In other words, the pair of moving units 2440 are carried in the opposite directions along the axial direction of the right-and-left screw shaft 2420 when the right-and-left screw shaft 2420 is rotated. The base ends of the pair of supporting units 242 are fixed to the corresponding moving units 2440.

(Reciprocating Mechanism)

The reciprocating mechanism 2500 includes a reciprocating servo motor 2510, a spline shaft 2520 that transmits the driving force of the reciprocating servo motor 2510, a pair of spline nut units 2522, and a pair of linking units 2580.

The reciprocating servo motor 2510 is mounted on the frame 2417 at the base end of the left hand 235a in the manner so that the longitudinal direction of the reciprocating servo motor 2510 is laid in parallel with the reciprocating axis AXp. The reciprocating servo motor 2510 is arranged to face an opposite direction from the opening-and-closing servo motor 2410. Furthermore, the reciprocating servo motor 2510 is arranged side by side with the opening-and-closing servo motor 2410, when the left hand 235a is viewed from the side (viewing from the load side of the reciprocating servo motor 2510 or the opening-and-closing servo motor 2410). Therefore, the size of the left hand 235a can be reduced compared with an arrangement where the reciprocating servo motor 2510 and the opening-and-closing servo motor 2410 are not arranged in the manner described above.

An encoder (not illustrated) arranged in the reciprocating servo motor 2510 can be an absolute value encoder. A backup battery for the absolute value encoder is mounted on the frame 2417.

The spline shaft 2520 is supported rotatably on a bearing 2523 arranged on the frame 2417 at a position nearer to the fore end of the left hand 235a than the right-and-left screw shaft 2420. The spline shaft 2520 is also arranged in parallel with the longitudinal direction of the reciprocating servo motor 2510 at a position nearer to the fore end of the left hand 235a than the reciprocating servo motor 2510. The spline shaft 2520 is driven by the reciprocating servo motor 2510 through a second belt pulley unit 2533 including at least a timing belt 2530 and a pulley 2531.

The pair of spline nut units 2522 each include at least a first spline nut 2541 located on an inner circumferential side and a second spline nut 2542 located on an outer circumferential side.

The first spline nut 2541 can move along the axial direction of the spline shaft 2520 by being rotated with the spline shaft 2520. The first spline nut 2541 is, for example, a ball spline inner race.

The second spline nut 2542 can move with the first spline nut 2541 along the rotation axis of the spline shaft 2520, and can be rotated relative to the first spline nut 2541 about the rotation axis of the first spline nut 2541. The second spline nut 2542 is fixed to the inner surface of the supporting unit 242 at the base end of the supporting unit 242. The second spline nut 2542 is, for example, a ball spline outer race.

Each of the linking units 2580 includes a disk (an example of a rotating member) 2582 rotating about the reciprocating axis AXp, and a pair of bar-like links 2585 for connecting the disk 2582 to the first spline nut 2541, and are capable of transmitting rotation of the first spline nut 2541 to the capturing claws 236 by means of this link mechanism.

One end of each of the links 2585 is connected to corresponding one of a pair of first link pins 2586 protruding from the outer end surface of the corresponding first spline nut 2541. The first link pins 2586 are disposed symmetrically with respect to the rotation axis of the first spline nut 2541 when viewed from the direction of the rotation axis of the first spline nut 2541. Being "symmetrical" herein does not necessarily mean symmetrical in an exact sense. In other words, being in "symmetrical" means being "substantially symmetrical", with some allowance for designing and manufacturing tolerance (the same applies hereinafter). The one end of each of the links 2585 is connected to the corresponding first link pin 2586 in a rotatable manner about the axis of the first link pin 2586.

The other end of each of the links 2585 is connected to corresponding one of a pair of second link pins 2587 protruding from the outer end surface of the disk 2582. The second link pins 2587 are disposed symmetrically with respect to the reciprocating axis AXp when viewed from the direction of the reciprocating axis AXp. The other end of each of the links 2585 is connected to the corresponding second link pin 2587 in a rotatable manner about the axis of the second link pin 2587.

One end of a shaft 2555 rotating about the reciprocating axis AXp is fixed to the inner side of the disk 2582 at the rotation center of the disk 2582. The other end of the shaft 2555 is fixed to the corresponding capturing claw 236 at the base end of the capturing claw 236 inside of the supporting units 242.

Alternatively, a second spline nut 2542a may be fixed to the outer circumference of a first spline nut 2541a so as not to be rotated relatively to the first spline nut 2541a. In such a structure, as illustrated in FIGS. 16H and 16I, the second spline nut 2542a is arranged at the base end of the supporting unit 242 via bearings 2543, and is capable of rotating with the spline shaft 2520 (the first spline nut 2541a). One end of each of the links 2585 is connected to a corresponding first link pin 2586a arranged on the outer end surface of the second spline nut 2542a, in a manner rotatable about the first link pin 2586a. First link pins may also be arranged on the outer end surface of the first spline nut 2541a.

In other words, the first spline nut 2541a and the second spline nut 2542a can be moved along the axial direction of the spline shaft 2520 in an integrated manner, and both can be rotated with the spline shaft 2520. As a result, when the spline shaft 2520 is rotated, the links 2585 are driven.

Operations of the left hand 235a (an opening and closing operation and a reciprocating operation of the capturing claws 236) will now be explained.

(Opening and Closing Operation)

As illustrated in FIG. 16E, when the opening-and-closing servo motor 2410 is rotated to one direction, the rotation is transmitted through the first belt pulley unit 2433, causing the right-and-left screw shaft 2420 to rotate. Because the right-and left-direction screws are formed on the right-and-left screw shaft 2420, the moving units 2440 are caused to move toward the inner side along the right-and-left screw shaft 2420. As the moving units 2440 are moved, the gap between the supporting units 242, which are respectively fixed to the respective moving units 2440, becomes narrower, and the capturing claws 236 are closed.

The supporting units 242 are fixed to the respective spline nut units 2522 (more specifically, the second spline nuts 2542) included in the reciprocating mechanism 2500. However, the spline nut units 2522 (more specifically, the first spline nuts 2541) can move freely along the spline shaft 2520. Therefore, although the capturing claws 236 are fixed to the spline nut units 2522 included in the reciprocating mechanism 2500, the opening and closing operations of the capturing claws 236 are not prevented.

Figure 16F:
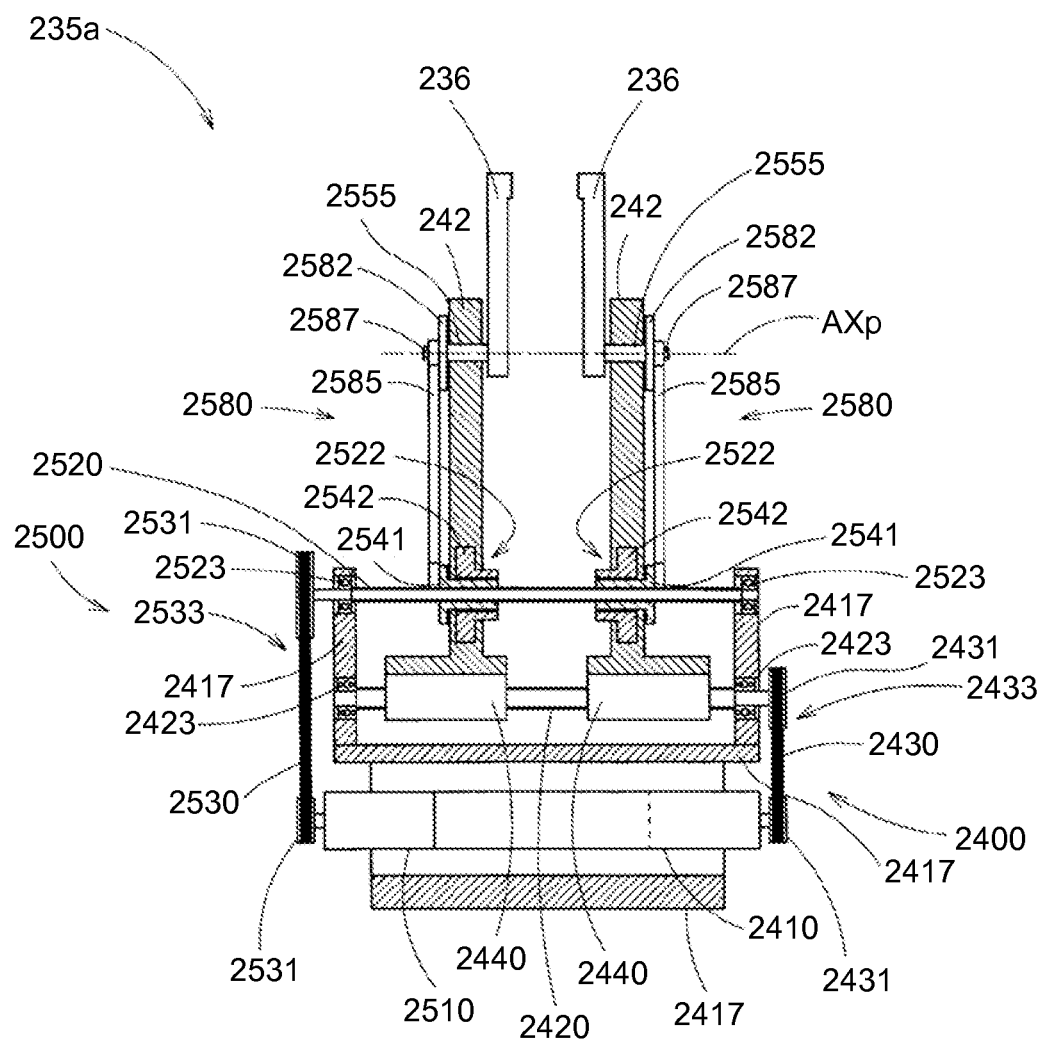
FIG. 16F is a schematic illustrating the internal structure of the left hand included in the dual-arm manipulator with the capturing claws opened.

On the contrary, when the opening-and-closing servo motor 2410 is rotated in the opposite direction, obviously, the capturing claws 236 are opened in the manner illustrated in FIG. 16F. Therefore, an explanation thereof will be omitted herein.

(Reciprocating Operation)

As illustrated in FIG. 16E, when the reciprocating servo motor 2510 is rotated in one direction, the rotation is transmitted through the second belt pulley unit 2533, and the spline shaft 2520 is caused to rotate. The rotation of the spline shaft 2520 is transmitted to the first spline nuts 2541 in the respective spline nuts 2522, and the first spline nuts 2541 are caused to rotate. At this time, because the second spline nuts 2542 can rotate about the axis of the spline shaft 2520 in a manner not associated with the rotation of the first spline nuts 2541 (the spline shaft 2520), the rotation of the first spline nuts 2541 is not transmitted to the supporting units 242.

Figure 16G:
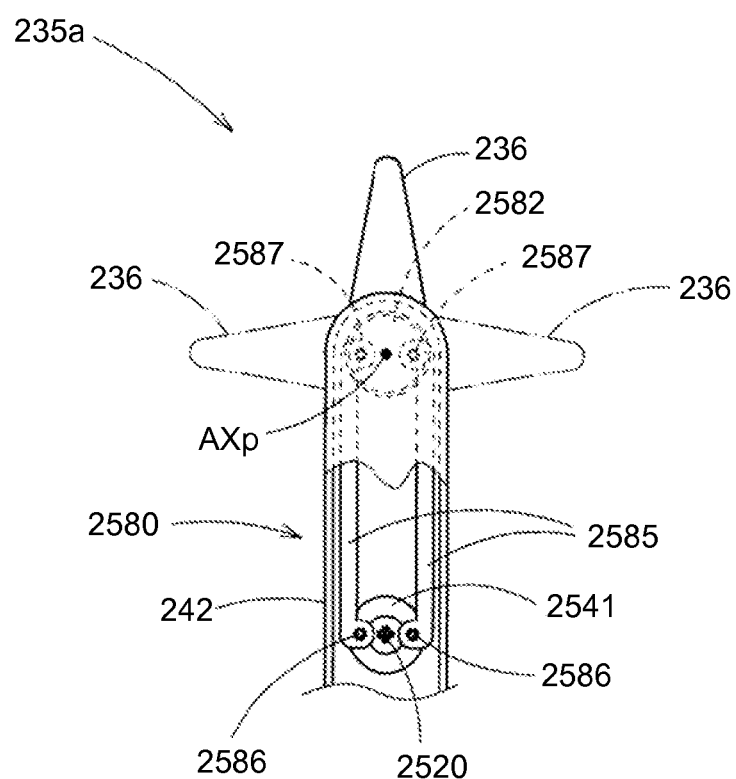
FIG. 16G is a schematic for explaining a reciprocating operation of the capturing claws on the left hand included in the dual-arm manipulator.
Figure 16H:
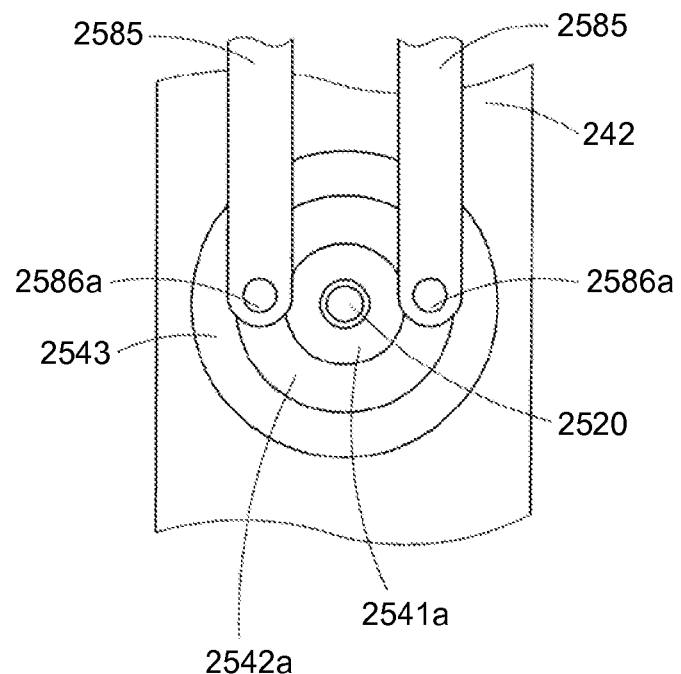
FIGS. 16H and 16I is an enlarged view for explaining another example of a first spline nut and a second spline nut included in the left hand in the dual-arm manipulator.
Figure 16I:
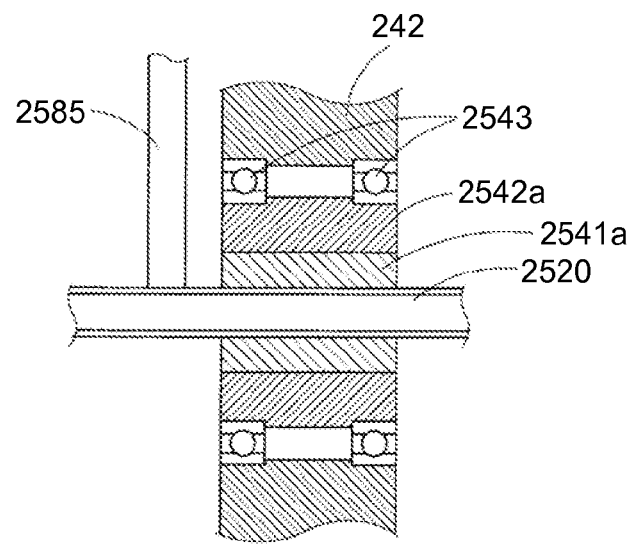

When the first spline nuts 2541 are rotated, the links 2585 are rotated, and the disks 2582 and the shafts 2555 are caused to rotate about the reciprocating axis AXp via the respective links 2585. As a result, as illustrated in FIG. 16G, the capturing claws 236 can be moved within the range of ±90 degrees, for example, about the reciprocating axis AXp. The capturing claws 236 are positioned at any angle by controlling the rotation angle of the reciprocating servo motor 2510.

Because the opening-and-closing mechanism 2400 and the reciprocating mechanism 2500 operate independently, the opening and closing operation and the reciprocating operation of the capturing claws 236 can be performed independently.

Figure 21:
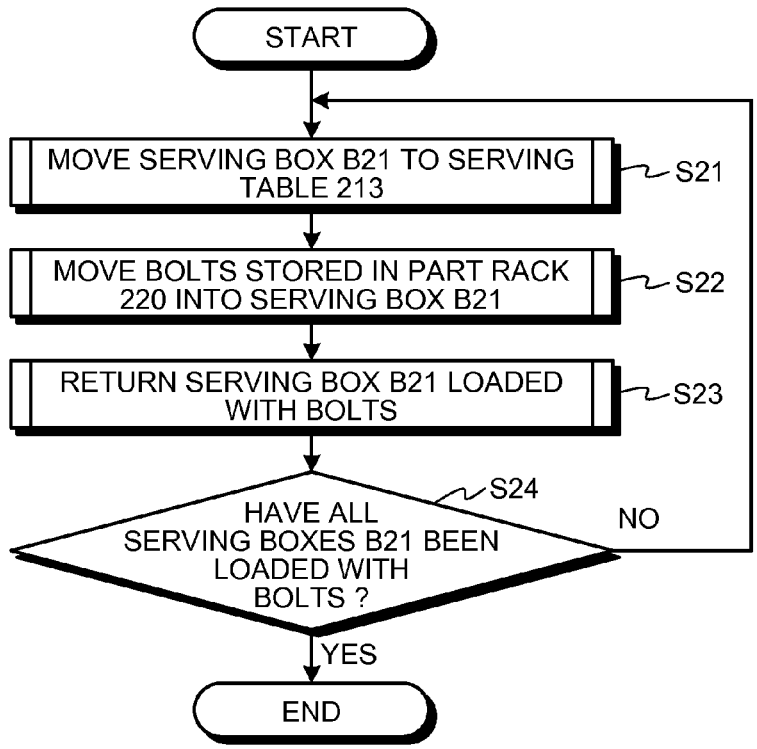
FIG. 21 is a flowchart of a method of picking up the bolts performed by the part picking system having the dual-arm manipulator (Step S21 to S24).

A method for picking up a bolt performed by the part picking system 210 will now be explained. This method for picking up a bolt is generally classified into Steps S21 to S24, as illustrated in FIG. 21. Step S21 is a step at which the dual-arm manipulator 211 moves the serving box B21 from the delivery carriage 212 to the serving table 213. Step S22 is a step at which the dual-arm manipulator 211 moves the bolts stored in the part racks 220 into the serving boxes B21. Step S23 is a step at which the dual-arm manipulator 211 returns the serving boxes B21 loaded with the bolts. Step S24 is a step for determining whether the operation is to be stopped. Each of Steps S21 to S24 will be explained below one by one.

(Preparation)

An operator carries the delivery carriage 212, on which empty serving boxes B21 are placed, through the gate. As mentioned earlier, the serving boxes B21 can be stacked at five locations, for example, along the outer circumference of the top panel 252 on the top panel 252 of the delivery carriage 212. However, as illustrated in FIG. 13, one of these locations is kept empty so that the serving boxes B21 loaded with the bolts can be returned. After the delivery carriage 212 is brought in, the air cylinder (not illustrated) lifts the delivery carriage 212, and the delivery carriage 212 is fixed. The operator makes operations on the touch panel 2110 (see FIG. 15) to start up the entire part picking system 210.

(Step S21)

Figure 22:
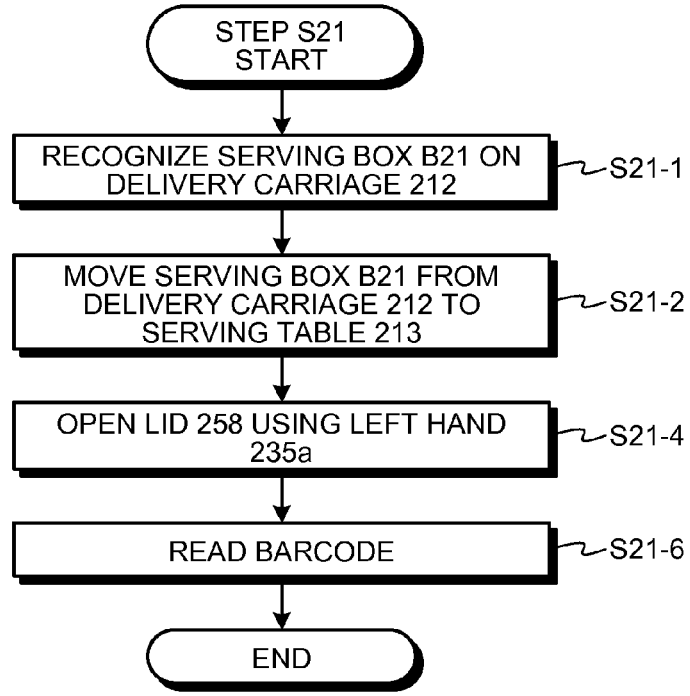
FIG. 22 is a flowchart of main operations performed in the method of picking up the bolts performed by the part picking system having the dual-arm manipulator (Step S21).

To begin with, Step S21 illustrated in FIG. 22 and at which the dual-arm manipulator 211 moves the serving boxes B21 to the serving table 213 will now be explained. In FIG. 22, only main operations are illustrated.

(Step S21-1)

After the system is started, the dual-arm manipulator 211 performs an operation for recognizing the serving box B21 on the delivery carriage 212. The dual-arm manipulator 211 grabs the handle bars 261 on the delivery carriage 212 using the supporting units 242 on the left hand 235a. The dual-arm manipulator 211 then rotates the top panel 252, and moves the empty serving box B21 to be loaded with bolts to a predetermined position.

The dual-arm manipulator 211 then moves the right hand 235b on the right arm 211b above the serving box B21 placed on the delivery carriage 212, and lowers the right hand 235b from that position. When the right hand 235b is brought into contact with the serving box B21, the output signal of the right force sensor 233b changes. Therefore, the dual-arm manipulator 211 can recognize that the position where the output signal has changed is where the serving box B21 on the uppermost layer is located. Because the size of the serving box B21 and the height of the top panel 252 are known, the number of layers of the serving boxes B21 can be recognized by recognizing the position of the uppermost serving box B21.

This recognizing operation is repeated for each of the columns, and the system controller 224 recognizes the total number of the serving boxes B21 and the number of the serving boxes B21 in each of the locations on the rotating table 251 via the robot controller 222. In this manner, the positions and the number of the serving boxes B21 are recognized without using any special sensor.

(Step S21-2)

The dual-arm manipulator 211 grabs the handles 256 on the serving box B21 with both of the left hand 235a and the right hand 235b, and lifts the serving box B21 along the guiding poles 254 to a position higher than the top ends of the guiding poles 254.

The dual-arm manipulator 211 then rotates the torso 211c, brings down the serving box B21, and places the serving box B21 onto the serving table 213.

(Step S21-3)

If the load sensor arranged on the serving table 213 detects the serving box B21, the system controller 224 determines that the serving box B21 is placed correctly onto the serving table 213, and executes the next step.

On the contrary, if the load sensor does not detect the serving box B21, the system controller 224 determines that some abnormality has occurred, and executes a predetermined alarming process (for example, a temporary stopping process).

(Step S21-4)

The dual-arm manipulator 211 then places the capturing claws 236 on the left hand 235a onto the bottom surface of the handle 259 on the lid 258, and opens the lid 258 by moving the capturing claws 236 upwardly. The lid 258 is supported opened by the supporting member 270, opened by an angle of 100 to 140 degrees from the position where the lid 258 is closed, for example.

(Step S21-5)

If the opening/closing detection sensor arranged on the serving table 213 detects that the lid 258 is opened, the system controller 224 determines that the lid 258 is opened correctly, and executes the next step.

On the contrary, if the opening/closing detection sensor does not detect that the lid 258 is opened, the system controller 224 determines that some abnormality has occurred, and executes a predetermined alarming process.

(Step S21-6)

The barcode reader then reads the two-dimensional barcodes pasted on the serving box B21. The information (the first mapping information) is sent to the system controller 224. If the first mapping information is not received, the system controller 224 determines that some abnormality has occurred, and executes a predetermined alarming process.

(Step S22)

Figure 23:
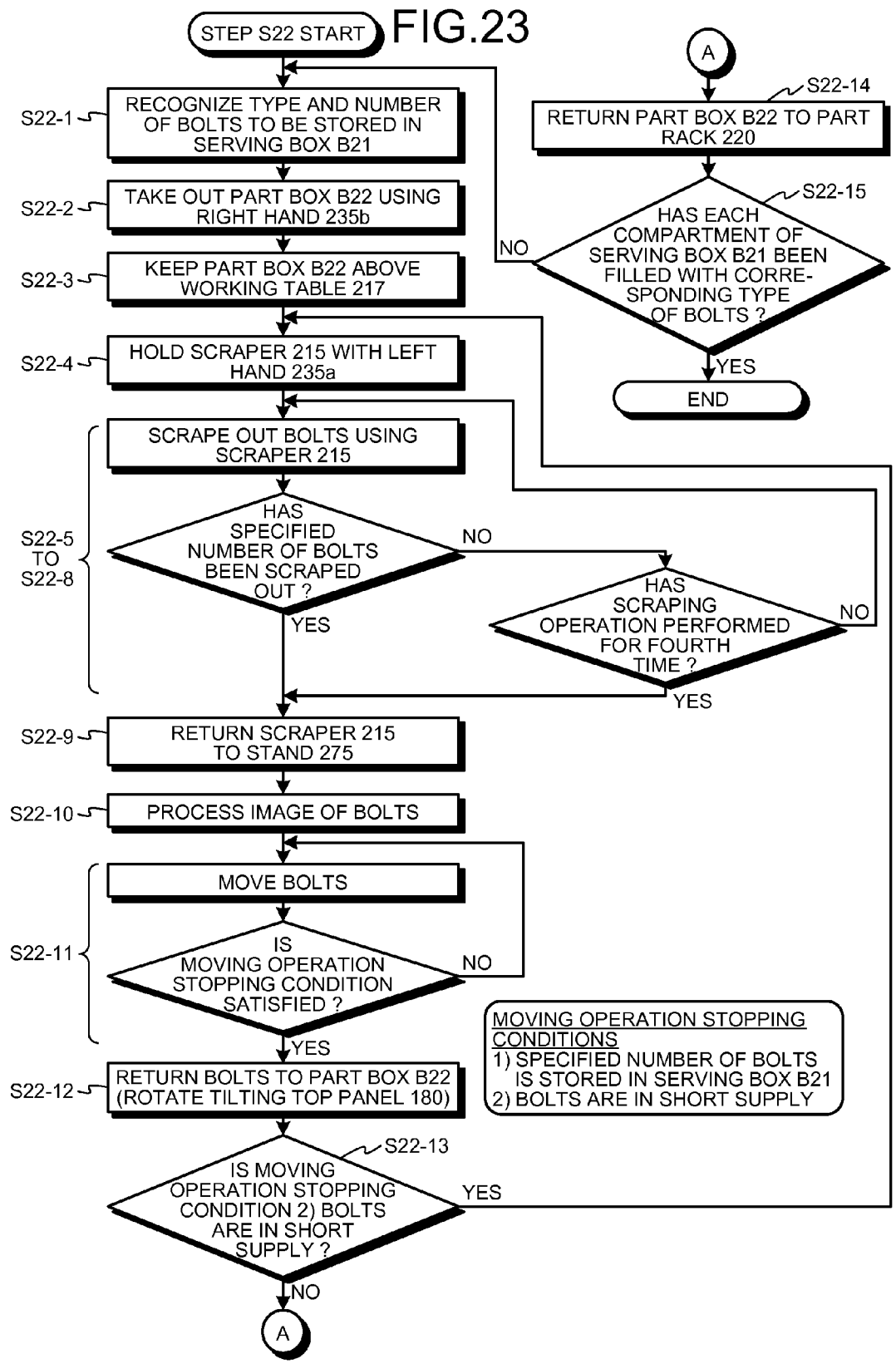
FIG. 23 is a flowchart of main operations performed in the method of picking up the bolts performed by the part picking system having the dual-arm manipulator (Step S22).

Step S22 illustrated in FIG. 23 and at which the dual-arm manipulator 211 moves a bolt stored in the part rack 220 into the serving box B21 placed on the serving table 213 will now be explained. In FIG. 23, only main operations are illustrated.

(Step S22-1)

The system controller 224 recognizes the information about the type and the number of bolts to be stored in each compartment of the serving box B21 on the serving table 213 based on the received first mapping information.

(Step S22-2)

The system controller 224 then issues a command to the robot controller 222 to take out the part box B22 containing the bolts of the corresponding type. The robot controller 222 controls the dual-arm manipulator 211 based on the command. According to the command of the robot controller 222, the dual-arm manipulator 211 rotates the torso 211c, and takes out the corresponding part box B22 stored in a predetermined compartment of the part rack 220. More specifically, the dual-arm manipulator 211 uses the capturing claws 244 on the right hand 235b to hold the rear side plate 2120c of the part box B12 from the vertical directions, and pulls out the part box B22 toward the front to take out the part box B22.

The right force sensor 233b is then used to weigh the bolts in the part box B22. The weight of the part box B22 held by the dual-arm manipulator 211 for the first time after the part picking system 210 is started is stored in the system controller 224 as an initial weight.

(Step S22-3)

The dual-arm manipulator 211 rotates the torso 211c, and directly faces the working table 217. The dual-arm manipulator 211 then lowers the front side of the part box B22, and keeps the part box B22 tilted above the tilting top panel 280 on the working table 217.

(Step S22-4)

The dual-arm manipulator 211 connects the scraper 215 to the tool holders on the left hand 235a to capture the scraper 215 (more specifically, the adaptor) placed on the stand 275.

(Step S22-5)

Figure 19:
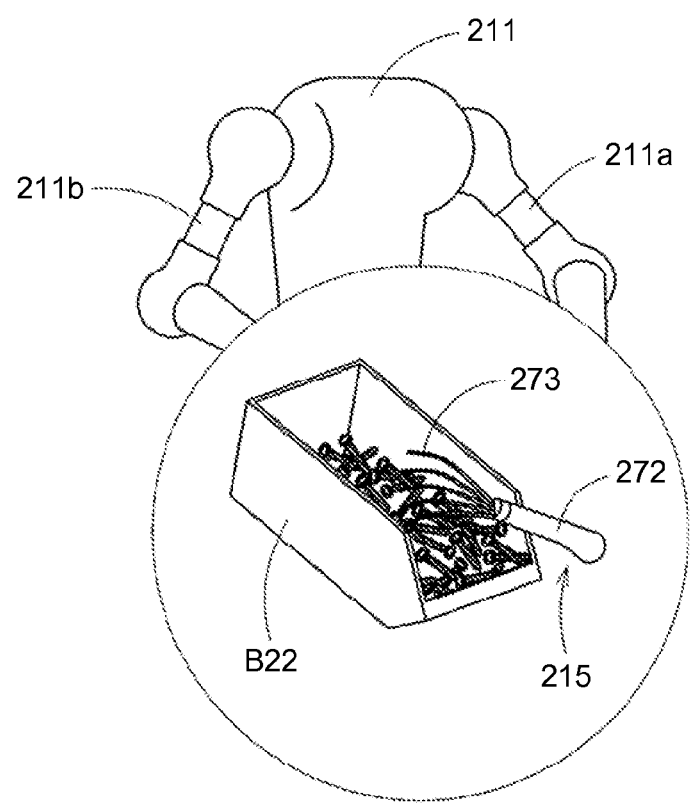
FIG. 19 is a schematic for explaining how the dual-arm manipulator scrapes out bolts.

The dual-arm manipulator 211 performs a scraping operation to scrape out the bolts from the part box B22 onto the tilting top panel 280 using the scraper 215 (see FIG. 19). The scraping operation will now be explained in detail. FIG. 19 is a schematic of how the dual-arm manipulator 211 scrapes out the bolts. The left hand 235a holding the scraper 215 and the right hand 235b holding the part box B22 are omitted in this drawing.

Figure 20A:
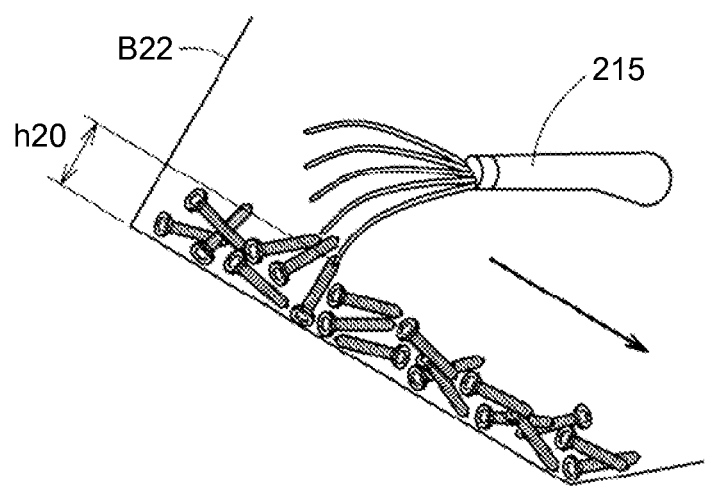
FIGS. 20A and 20B are schematics for explaining the part box and a scraper while the dual-arm manipulator is scraping out the bolts.

When the dual-arm manipulator 211 performs the scraping operation for the first time, the level of the bolts from the bottom of the part box B22 has not yet been exactly measured. Therefore, the scraper 215 is placed into the part box B22 while monitoring the output value of the left force sensor 233a, and the height where the output value of the left force sensor 233a changes, that is, where the scraper 215 is brought into contact with bolts is established as a reference height h20 from the bottom of the part box B22 (see FIG. 20A). The dual-arm manipulator 211 further digs the scraper 215 into a predetermined depth from the reference height h20 (for example, 0 to 5 millimeters), and moves the bolts to the front side of the part box B22 and scrapes out the bolts. The force applied to scrape out the bolts is adjusted based on the measurement of the left force sensor 233a arranged on the left arm 211a. The two-dimensional camera 2100 captures an image of the bolts on the tilting top panel 280, and the image is applied with an image process in the manner to be described later.

Therefore, if the bolts overlap each other, it would be difficult or impossible to detect the positions and the orientations of the bolts in the two-dimensional image. Thus, the bolts thus scraped out are preferably scattered to a degree not overlapping each other on the tilting top panel 280. In the second embodiment, a quantity of bolts that allows the positions and the orientations of the bolts to be detected in an optimal manner is obtained based on experiments and the like and is set in advance, and this predetermined quantity of bolts is scraped out using the scraper 215 with reference to the output value of the left force sensor 233a. Therefore, the possibility of bolts overlapping each other on the tilting top panel 280 can be suppressed, and the positions and the orientations of a larger amount of bolts can be detected in the two-dimensional image.

(Step S22-6)

After performing the scraping operation for the first time, if it is determined that the bolts thus scraped out has reached the predetermined quantity, Step S22-9 is executed. The predetermined quantity is obtained based on the output of the right force sensor 233b. Therefore, for example, such a predetermined quantity of bolts can be measured without providing a special sensor such as a weight scale.

Figure 20B:
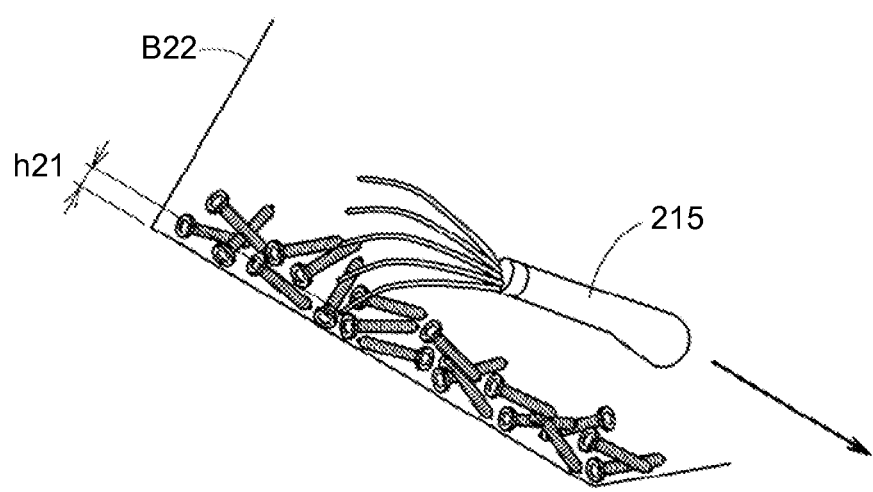

On the contrary, if it is determined that the bolts thus scraped out has not reached the predetermined quantity, the dual-arm manipulator 211 performs the scraping operation for the second time. Upon performing the scraping operation for the second time, the scraper 215 is dug deeper into the bolts than the position where the bolts were scraped out at the first time (e.g., 3 to 10 millimeters) to scrape out the bolts from the height h21 (FIG. 20B).

(Step S22-7)

If it is determined that the bolts thus scraped out has reached the predetermined quantity after performing the scraping operation for the second time, Step S22-9 is executed.

On the contrary, if it is determined that the bolts thus scraped out has not reached the predetermined quantity, the dual-arm manipulator 211 performs the scraping operation for the third time. Upon performing the scraping operation for the third time, the scraper 215 is dug deeper into the bolts than the position where the bolts were scraped out at the second time (e.g., 3 to 10 millimeters) to scrape out the bolts.

(Step S22-8)

If it is determined that the bolts thus scraped out has reached the predetermined quantity after performing the scraping operation for the third time, Step S22-9 is executed.

On the contrary, if it is determined that the bolts thus scraped out has not reached the predetermined quantity, the dual-arm manipulator 211 performs the scraping operation for the fourth time. Upon performing the scraping operation for the fourth time, the scraper 215 is dug deeper into the bolts than height where the bolts were scraped out at the third time (e.g., 3 to 10 millimeters) to scrape out the bolts.

After performing the scraping operation for the fourth time, Step S22-9 below is executed regardless of whether the bolts thus scraped out has reached the predetermined quantity. In the second embodiment, the upper limit of the number of the times the scraping operation is performed is set to four. However, this upper limit may be set to any number.

(Step S22-9)

The dual-arm manipulator 211 returns the scraper 215 held in the left hand 235a to the stand 275.

(Step S22-10)

The two-dimensional camera 2100 controlled by the system controller 224 captures an image of the same type of bolts scraped out onto the tilting top panel 280. The image processing computer 226 detects the edge of the two-dimensional image of the bolts thus captured, for example, and matches the two-dimensional image against a template of the bolt stored in advance to obtain the position and the orientation of each of the bolts scattered across the tilting top panel 280. The robot controller 222 receives the position and the orientation of each of the bolts thus obtained via the system controller 224.

(Step S22-11)

The robot controller 222 operates the dual-arm manipulator 211 based on the position and the orientation of each of the bolts. The dual-arm manipulator 211 moves the left hand 235a near a bolt to be captured. The dual-arm manipulator 211 then rotates the entire left hand 235a about the rotation axis AXta, and reciprocates the capturing claws 236 about the reciprocating axis AXp to change the orientation of the bolt so that the bolt can be captured more easily. The dual-arm manipulator 211 then closes the capturing claws 236 to pick up the bolt from the tilting top panel 280.

For example, the dual-arm manipulator 211 rotates the entire left hand 235a or the capturing claws 236 so that the longitudinal direction of the capturing claws 236 will be in parallel with the axial direction of the bolt. The dual-arm manipulator 211 then moves the capturing claws 236 near the bolt from the above to pick up the head of the bolt while reducing the risks of the left arm 211a touching any object arranged therearound. The force for picking up the bolt is controlled by the opening-and-closing servo motor 2410.

In this manner, the dual-arm manipulator 211 can pick up a bolt mainly by rotating the left hand 235a to change the direction of the capturing claws 236, without moving the left arm 211a by a large degree. In other words, the dual-arm manipulator 211 does not need to change the position of the left arm 211a by a large degree to pick up a bolt, compared with a structure in which the capturing claws 236 are not reciprocated about the reciprocating axis AXp. Therefore, the positional change of the left arm 211a required in picking up a bolt and the time required in moving the bolt can be reduced, compared with the structure in which the capturing claws 236 are not reciprocated about reciprocating axis AXp. Furthermore, the range where the dual-arm manipulator 211 can pick up a bolt can be increased.

The dual-arm manipulator 211 then moves the bolt thus picked up into a predetermined compartment of the serving box B21 (the compartment mapped in the first mapping information) based on the first mapping information read from the two-dimensional barcode.

This step is repeated by the number of bolts included in the first mapping information, and the bolts of the same type are stored in the predetermined compartment. While the bolts are being moved by the left hand 235a, the part box B22 held in the right hand 235b is temporarily placed on the part box stand 290 arranged on the working table 217. If the load sensor on the part box stand 290 determines that the part box B22 is not placed on the part box stand 290, the dual-arm manipulator 211 temporarily stops its operation.

This step is repeated until a moving operation stopping condition is satisfied. This moving operation stopping condition is either: 1) the number of bolts indicated by the two-dimensional barcode is stored in the serving box B21, or 2) the bolts on the tilting top panel 280 are in short supply during the moving operation.

(Step S22-12)

When the moving operation stopping condition is satisfied, the dual-arm manipulator 211 grabs the tilting top panel 280 using the supporting units 242 on the left hand 235a, and rotates the tilting top panel 280 about the rotation axis AX24 and tilts the tilting top panel 280. In this manner, the bolts on the tilting top panel 280 are returned to the part box B22 placed on the part box stand 290. At this time, the dual-arm manipulator 211 holds down the part box B22 with the right hand 235b so that the part box B22 does not move. Because the dual-arm manipulator 211 tilts down the tilting top panel 280 to return the bolts into the part box B22 in the manner described above, it is not necessary to provide a special mechanism for returning the bolts to the part box B22.

(Step S22-13)

If the moving operation is stopped because the number of bolts indicated by the two-dimensional barcode is stored in the serving box B21, (when the moving operation stopping condition 1) is satisfied), next Step S22-14 is executed.

On the contrary, if the bolts on the tilting top panel 280 are in short supply during the moving operation (when the moving operation stopping condition 2) is satisfied), Step S22-5 and subsequent steps are performed until the quantity of bolts reaches the quantity of bolts indicated by the first mapping information.

(Step S22-14)

The dual-arm manipulator 211 holds the part box B22 using the right hand 235b, and returns the part box B22 to the part rack 220 where the part box B22 was originally stored. After moving the last bolt to the serving box B21 and before returning the part box B22 to the part rack 220 where the part box B22 was originally stored, the system controller 224 measures the weight of the bolts remaining in the part box B22 based on the output signal of the right force sensor 233b arranged on the right arm 211b. Therefore, the weight of the bolts remaining in the part box B22 can be measured without providing a special sensor such as a weight scale.

If the system controller 224 determines that the weight of the remaining bolts is lower than a predetermined weight, the system controller 224 turns on the corresponding lamp on the part rack 220. For example, if the weight of the remaining bolts becomes equal to or less than 80 percent of the initial weight stored at Step S22-2, the system controller 224 turns on the corresponding lamp. In this manner, the operator can check the timing for filling up the bolts to the part box B22.

(Step S22-15)

The system controller 224 determines if each of the compartments in the serving box B21 has been filled with a corresponding type of bolts. If each of the compartments in the serving box B21 has been filled with a corresponding type of bolts, subsequent Step S23 is executed. If each of the compartments in the serving box B21 has not been filled with a corresponding type of bolts, the dual-arm manipulator 211 repeats Steps S22-2 to S22-14 to move another type of bolts to the serving box B21.

At this time, because the left hand 235a of the dual-arm manipulator 211 has the capturing claws 236 that can be opened and closed, the same left hand 235a can be used to capture a bolt of another type (a bolt with a different diameter). In other words, it is not necessary to prepare separate hands for capturing bolts of different diameters, and the same hand can be used to capture any bolt.

(Step S23)

Figure 24:
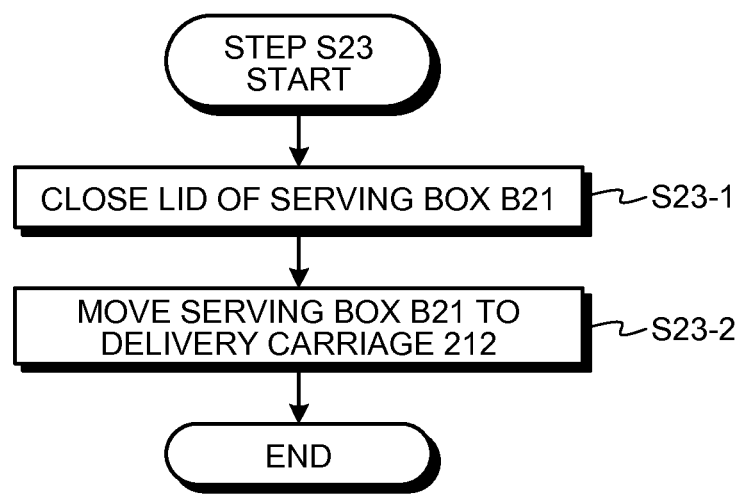
FIG. 24 is a flowchart of operations performed in the method of picking up the bolts performed by the part picking system having the dual-arm manipulator (Step S23).

Step S23 illustrated in FIG. 24 and at which the dual-arm manipulator 211 returns the serving box B21 loaded with the bolts will now be explained.

(Step S23-1)

The dual-arm manipulator 211 bends down the capturing claws 236 on the left hand 235a. The dual-arm manipulator 211 rests the capturing claws 236 on the handle 259 arranged on the lid 258 that is supported by the supporting member 270, and moves the handle 259 forward to close the lid 258.

(Step S23-2)

To place the serving box B21 on the empty space on the delivery carriage 212, the dual-arm manipulator 211 grabs the handle bars 261 using the left hand 235a, rotates the top panel 252 of the rotating table 251, and moves the top panel 252 to a predetermined position.

The dual-arm manipulator 211 rotates the torso 211c to the direction of the delivery carriage 212, while lifting the serving box B21 by holding the handles 256 on the serving box B21 with the left hand 235a and the right hand 235b. The dual-arm manipulator 211 lowers the serving box B21 along the guiding poles 254, and places the serving box B21 onto the top panel 252 of the rotating table 251.

(Step S24)

After completing Step S23-2, the part picking system 210 repeats Steps S21-2 to S23-2 for each one of the serving boxes B21 placed on the delivery carriage 212 (see FIG. 21).

In this manner, through Steps S21 to S24, the part picking system 210 can take out bolts of a required type from the part rack 220 in a required number, and store the bolts in the serving box B21 placed on the delivery carriage 212 using the two-dimensional camera 2100 and the dual-arm manipulator 211. These series of operations may be performed in parallel when possible, instead of being performed sequentially. The delivery carriage 212 on which the serving boxes B21 storing therein the bolts are placed is carried through the gate.

The present invention is not limited to the second embodiment described above, and may be modified within a scope not deviating from the spirit of the present invention. For example, any combinations or variations of a part or a whole of the structures according to the second embodiment are within the technical scope of the present invention.

The serving boxes B21 are carried on the delivery carriage 212. However, the serving boxes B21 may also be carried by a conveyor. The two-dimensional barcode may be replaced with an IC tag, and an IC tag reader may be used instead of the barcode reader.

It should be obvious that the parts are not limited to bolts. Another example of the parts is electrical components. The left arm 211a and the right arm 211b are not limited to a multi-joint manipulator having seven axes, and may be any multi-joint manipulator having seven or more axes.

Furthermore, to mention by limiting the part moving operation, the robot may be a direct drive robot including the left hand 235a. Furthermore, the link mechanism used in the linking units 2580 may be any link mechanism as long as the rotation of the first spline nuts 2541 can be transmitted to the shaft 2555. For example, another link mechanism such as a reciprocating slider crank may be used.

The first belt pulley unit 2433 may be replaced with a rotation transmitting unit including at least a gear such as a spur gear. The opening-and-closing servo motor 2410 and the reciprocating servo motor 2510 is not limited to an electromagnetic motor, and may be a pneumatic motor.

The linking units 2580 transmit the rotation of the respective first spline nuts 2541 to the capturing claws 236 by means of the link mechanism. However, a belt pulley mechanism may also be used instead of the link mechanism. The link mechanism is more preferable from the viewpoint of downscaling the fore end of the left hand 235a.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

In regards to the embodiments, the following aspects are disclosed.

(Note 1) A hand comprising:
a pair of supporting units;
a pair of capturing claws that are supported on inner surfaces of the pair of respective supporting units and capture a part;

an opening-and-closing mechanism that opens and closes the pair of supporting units along a reciprocating axis intersecting with longitudinal directions of the supporting units; and a reciprocating mechanism that causes the pair of capturing claws to rotate about the reciprocating axis to change a direction of each tip of the capturing claws.

(Note 2) The hand according to Note 1, wherein the opening-and-closing mechanism comprises:

an opening-and-closing servo motor;

a right-and-left screw shaft that is rotated by the opening-and-closing servo motor, and on which screws threaded in opposite directions are formed at right and left ends;

a pair of moving units that are caused to move in opposite directions along a rotation axis of the right-and-left screw shaft by rotation of the right-and-left screw shaft, wherein the pair of supporting units are fixed to the pair of respective moving units.

(Note 3) The hand according to Note 1 or 2, wherein the reciprocating mechanism comprises:

a reciprocating servo motor;

a spline shaft that is rotated by the reciprocating servo motor;

a pair of first spline nuts that are rotated with the spline shaft about a rotation axis of the spline shaft, and are capable of moving along the rotation axis of the spline shaft;

a pair of second spline nuts that are fixed to the pair of respective supporting units, move with the respective first spline nuts along the rotation axis of the spline shaft, and are capable of being rotated relatively to the respective first spline nuts about a rotation axis of the first spline nuts, wherein the pair of capturing claws are driven and reciprocated by the pair of respective first spline nuts.

(Note 4) The hand according to Note 3, wherein the pair of capturing claws are driven by the pair of respective first spline nuts through a belt pulley mechanism.

(Note 5) The hand according to Note 4, wherein the opening-and-closing servo motor and the reciprocating servo motor face opposite directions to each other with a longitudinal direction of the opening-and-closing servo motor and a longitudinal direction of the reciprocating servo motor being arranged substantially in parallel with the reciprocating axis, and are disposed at a base end of the hand.

(Note 6) The hand according to any one of Note 1 to 5, wherein the pair of supporting units comprises tool holders that hold a tool for adjusting an arrangement of a plurality of parts so as to allow the pair of capturing claws to capture each of the parts.

(Note 7) The hand according to Note 6, wherein the tool holders comprises:

a pair of first connectors facing each other; and a pair of second connectors facing each other, wherein a thickness of the first connectors and a thickness of the second connectors are reduced gradually toward an inner side of the supporting units, and each inner edge of the first connectors and each inner edge of the second connectors are formed to extend in directions intersecting with each other when viewed from the inner side of the supporting units.

(Note 8) A robot comprising:

a hand that captures a part, wherein the hand comprises:

a pair of supporting units;

a pair of capturing claws that are supported on inner surfaces of the pair of respective supporting units and capture a part;

an opening-and-closing mechanism that opens and closes the pair of supporting units along a reciprocating axis intersecting with longitudinal directions of the supporting units; and a reciprocating mechanism that causes the pair of capturing claws to rotate about the reciprocating axis to change a direction of each tip of the capturing claws.

(Note 9) A hand comprising:

a pair of supporting units;

a pair of capturing claws that are supported on inner surfaces of the pair of respective supporting units and capture a part;

an opening-and-closing mechanism that opens and closes the pair of supporting units along a reciprocating axis intersecting with longitudinal directions of the supporting units; and a reciprocating mechanism that causes the pair of capturing claws to rotate about the reciprocating axis to change a direction of each tip of the capturing claws.

(Note 10) The hand according to Note 9, wherein the opening-and-closing mechanism comprises:

an opening-and-closing servo motor;

a right-and-left screw shaft that is driven by the opening-and-closing servo motor through a rotation transmitting unit transmitting rotation, and on which screws threaded in opposite directions are formed at right and left ends;

a pair of moving units that are caused to move in opposite directions along a rotation axis of the right-and-left screw shaft by rotation of the right-and-left screw shaft, wherein the pair of supporting units are fixed to the pair of respective moving units.

(Note 11) The hand according to Note 10, wherein the rotation transmitting unit at least comprises a timing belt and a pulley.

(Note 12) The hand according to Note 10, wherein the rotation transmitting unit at least comprises a gear.

(Note 13) The hand according to any one of Notes 10 to 12, wherein the reciprocating mechanism comprises:

a reciprocating servo motor;

a spline shaft that is rotated by the reciprocating servo motor;

a pair of first spline nuts that are rotated with the spline shaft about a rotation axis of the spline shaft, and are capable of moving along the rotation axis of the spline shaft;

a pair of second spline nuts that are fixed to the pair of respective supporting units, move with the respective first spline nuts along the rotation axis of the spline shaft, and are capable of being rotated relatively to the respective first spline nuts about a rotation axis of the first spline nuts, wherein the pair of capturing claws are driven and reciprocated by the pair of respective first spline nuts.

(Note 14) The hand according to any one of Notes 10 to 12, wherein the reciprocating mechanism comprises:

a reciprocating servo motor;

a spline shaft that is rotated by the reciprocating servo motor;

a pair of first spline nuts that are rotate with the spline shaft about a rotation axis of the spline shaft, and are capable of moving along the rotation axis of the spline shaft;

a pair of second spline nuts that are fixed to the respective first spline nuts, rotate with the first spline nuts about the rotation axis of the spline shaft, and are capable of moving along the rotation axis direction of the spline shaft, wherein the pair of second spline nuts are arranged on the respective supporting units via respective bearings, and the pair of capturing claws are driven and reciprocated by the pair of respective first spline nuts or the pair of respective second spline nuts.

(Note 15) The hand according to Note 13 or 14, wherein the pair of capturing claws are driven by the pair of respective first spline nuts through respective link units transmitting rotation using a link mechanism.

(Note 16) The hand according to Note 15, wherein the link unit comprises a pair of links each 1) having one end rotatably connected to corresponding one of a pair of first link pins protruding from an outer end surface of the respective first spline nuts and arranged symmetrically with respect to the rotation axis of the respective first spline nuts, and 2) having another end rotatably connected to corresponding one of a pair of second link pins that protruding from an outer end surface of a rotating member rotating about the reciprocating axis and arranged substantially symmetrically with respect to the reciprocating axis.

(Note 17) The hand according to any one of Notes 13 to 16, wherein the opening-and-closing servo motor and the reciprocating servo motor face opposite directions to each other with a longitudinal direction of the opening-and-closing servo motor and a longitudinal direction of the reciprocating servo motor being arranged substantially in parallel with the reciprocating axis, and are disposed at a base end of the hand.

(Note 18) A robot comprising:
a hand that captures a part, wherein the hand comprises:
a pair of supporting units;
a pair of capturing claws that are supported on inner surfaces of the pair of respective supporting units and capture a part;
an opening-and-closing mechanism that opens and closes the pair of supporting units along a reciprocating axis intersecting with longitudinal directions of the supporting units; and
a reciprocating mechanism that causes the pair of capturing claws to rotate about the reciprocating axis to change a direction of each tip of the capturing claws.

What is claimed is:
1. A hand comprising:
a pair of supporting units;
a pair of capturing claws that are supported on inner surfaces of the pair of respective supporting units and capture a part;
an opening-and-closing mechanism that includes an opening-and-closing servo motor to open and close the pair of supporting units along a reciprocating axis intersecting with longitudinal directions of the supporting units; and
a reciprocating mechanism that includes a reciprocating servo motor to make the pair of capturing claws rotate about the reciprocating axis to change a direction of each tip of the capturing claws,
wherein the opening-and-closing servo motor and the reciprocating servo motor face opposite directions to each other with a longitudinal direction of the opening-and-closing servo motor and a longitudinal direction of the reciprocating servo motor being arranged substantially in parallel with the reciprocating axis, and are disposed at a base end of the hand.

2. The hand according to claim 1, wherein the opening-and-closing mechanism comprises:
a right-and-left screw shaft that is rotated by the opening-and-closing servo motor, and on which screws threaded in opposite directions are formed at right and left ends;
a pair of moving units that are caused to move in opposite directions along a rotation axis of the right-and-left screw shaft by rotation of the right-and-left screw shaft, wherein
the pair of supporting units are fixed to the pair of respective moving units.

3. The hand according to claim 2, wherein the reciprocating mechanism further comprises:
a spline shaft that is rotated by the reciprocating servo motor;
a pair of first spline nuts that are rotated with the spline shaft about a rotation axis of the spline shaft, and are capable of moving along the rotation axis of the spline shaft;
a pair of second spline nuts that are fixed to the pair of respective supporting units, move with the respective first spline nuts along the rotation axis of the spline shaft, and are capable of moving relatively to the respective first spline nuts about a rotation axis of the first spline nuts, wherein
the pair of capturing claws are driven and reciprocated by the pair of respective first spline nuts.

4. The hand according to claim 1, wherein the reciprocating mechanism comprises:
a spline shaft that is rotated by the reciprocating servo motor;
a pair of first spline nuts that are rotated with the spline shaft about a rotation axis of the spline shaft, and are capable of moving along the rotation axis of the spline shaft;
a pair of second spline nuts that are fixed to the pair of respective supporting units, move with the respective first spline nuts along the rotation axis of the spline shaft, and are capable of being rotated relatively to the respective first spline nuts about a rotation axis of the first spline nuts, wherein
the pair of capturing claws are driven and reciprocated by the pair of respective first spline nuts.

5. The hand according to claim 4, wherein the pair of capturing claws are driven by the pair of respective first spline nuts through a belt pulley mechanism.

6. The hand according to claim 1, wherein the opening-and-closing mechanism comprises:
a right-and-left screw shaft that is driven by the opening-and-closing servo motor through a rotation transmitting unit transmitting rotation, and on which screws threaded in opposite directions are formed at right and left ends;
a pair of moving units that are caused to move in opposite directions along a rotation axis of the right-and-left screw shaft by rotation of the right-and-left screw shaft, wherein
the pair of supporting units are fixed to the pair of respective moving units.

7. The hand according to claim 6, wherein the rotation transmitting unit at least comprises a timing belt and a pulley.

8. The hand according to claim 7, wherein the reciprocating mechanism further comprises:
a spline shaft that is rotated by the reciprocating servo motor;
a pair of first spline nuts that are rotated with the spline shaft about a rotation axis of the spline shaft, and are capable of moving along the rotation axis of the spline shaft;
a pair of second spline nuts that are fixed to the pair of respective supporting units, move with the respective first spline nuts along the rotation axis of the spline shaft, and are capable of moving relatively to the respective first spline nuts about a rotation axis of the first spline nuts, wherein the pair of capturing claws are driven and reciprocated by the pair of respective first spline nuts.

9. The hand according to claim 6, wherein the rotation transmitting unit at least comprises a gear.

10. The hand according to claim 9, wherein the reciprocating mechanism further comprises:

a spline shaft that is rotated by the reciprocating servo motor;

a pair of first spline nuts that are rotated with the spline shaft about a rotation axis of the spline shaft, and are capable of moving along the rotation axis of the spline shaft;

a pair of second spline nuts that are fixed to the pair of respective supporting units, move with the respective first spline nuts along the rotation axis of the spline shaft, and are capable of moving relatively to the respective first spline nuts about a rotation axis of the first spline nuts, wherein the pair of capturing claws are driven and reciprocated by the pair of respective first spline nuts.

11. The hand according to claim 6, wherein the reciprocating mechanism comprises:

a spline shaft that is rotated by the reciprocating servo motor;

a pair of first spline nuts that are rotated with the spline shaft about a rotation axis of the spline shaft, and are capable of moving along the rotation axis of the spline shaft;

a pair of second spline nuts that are fixed to the pair of respective supporting units, move with the respective first spline nuts along the rotation axis of the spline shaft, and are capable of being rotated relatively to the respective first spline nuts about a rotation axis of the first spline nuts, wherein the pair of capturing claws are driven and reciprocated by the pair of respective first spline nuts.

12. The hand according to claim 11, wherein the pair of capturing claws are driven by the pair of respective first spline nuts through respective link units transmitting rotation using a link mechanism.

13. The hand according to claim 12, wherein the link unit comprises a pair of links each 1) having one end rotatably connected to corresponding one of a pair of first link pins protruding from an outer end surface of the respective first spline nuts and arranged symmetrically with respect to the rotation axis of the respective first spline nuts, and 2) having another end rotatably connected to corresponding one of a pair of second link pins that protruding from an outer end surface of a rotating member rotating about the reciprocating axis and arranged substantially symmetrically with respect to the reciprocating axis.

14. The hand according to claim 6, wherein the reciprocating mechanism comprises:

a spline shaft that is rotated by the reciprocating servo motor;

a pair of first spline nuts that are rotated with the spline shaft about a rotation axis of the spline shaft, and are capable of moving along the rotation axis of the spline shaft;

a pair of second spline nuts that are fixed to the respective first spline nuts, rotate with the first spline nuts about the rotation axis of the spline shaft, and are capable of moving along the rotation axis direction of the spline shaft, wherein the pair of second spline nuts are arranged on the respective supporting units via respective bearings, and the pair of capturing claws are driven and reciprocated by the pair of respective first spline nuts or the pair of respective second spline nuts.

15. A hand comprising:

a pair of supporting units;

a pair of capturing claws that are supported on inner surfaces of the pair of respective supporting units and capture a part;

an opening-and-closing mechanism that opens and closes the pair of supporting units along a reciprocating axis intersecting with longitudinal directions of the supporting units; and a reciprocating mechanism that causes the pair of capturing claws to rotate about the reciprocating axis to change a direction of each tip of the capturing claws, wherein the pair of supporting units comprises tool holders that hold a tool for adjusting an arrangement of a plurality of parts so as to allow the pair of capturing claws to capture each of the parts.

16. The hand according to claim 15, wherein the tool holders comprises:

a pair of first connectors facing each other; and a pair of second connectors facing each other, wherein a thickness of the first connectors and a thickness of the second connectors are reduced gradually toward an inner side of the supporting units, and each inner edge of the first connectors and each inner edge of the second connectors are formed to extend in directions intersecting with each other when viewed from the inner side of the supporting units.

17. A robot comprising:

a hand that captures a part, wherein the hand comprises:

a pair of supporting units;

a pair of capturing claws that are supported on inner surfaces of the pair of respective supporting units and capture a part;

an opening-and-closing mechanism that includes an opening-and-closing servo motor to open and close the pair of supporting units along a reciprocating axis intersecting with longitudinal directions of the supporting units; and a reciprocating mechanism that includes a reciprocating servo motor to make the pair of capturing claws rotate about the reciprocating axis to change a direction of each tip of the capturing claws, wherein the opening-and-closing servo motor and the reciprocating servo motor face opposite directions to each other with a longitudinal direction of the opening-and-closing servo motor and a longitudinal direction of the reciprocating servo motor being arranged substantially in parallel with the reciprocating axis, and are disposed at a base end of the hand.

18. A hand comprising:

a pair of supporting means;

a pair of capturing means that are supported by the pair of respective supporting means and capture a part;

an opening-and-closing means that includes an opening-and-closing driving means to open and close the pair of supporting means along an axis intersecting with longitudinal directions of the supporting means; and a changing means that includes a reciprocating driving means to change a direction of each tip of the pair of capturing means about the axis, wherein the opening-and-closing driving means and the reciprocating driving means face opposite directions to each other with a longitudinal direction of the openingand-closing driving means and a longitudinal direction of the reciprocating driving means being arranged substantially in parallel with the reciprocating axis, and are disposed at a base end of the hand.

* * * * *